United States Patent
Tyan et al.

(10) Patent No.: US 10,315,698 B2
(45) Date of Patent: Jun. 11, 2019

(54) SIXTEEN-CORNERED STRENGTHENING MEMBER FOR VEHICLES

(71) Applicant: FORD GLOBAL TECHNOLOGIES, LLC, Dearborn, MI (US)

(72) Inventors: Tau Tyan, Northville, MI (US);
Yu-Kan Hu, Ypsilanti, MI (US);
Leonard Anthony Shaner, New Baltimore, MI (US); Dana Sun, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 146 days.

(21) Appl. No.: 14/749,426

(22) Filed: Jun. 24, 2015

(65) Prior Publication Data
US 2016/0375935 A1    Dec. 29, 2016

(51) Int. Cl.
| | |
|---|---|
| B60R 19/18 | (2006.01) |
| B62D 21/02 | (2006.01) |
| B62D 21/15 | (2006.01) |
| B62D 25/00 | (2006.01) |
| F16F 7/12 | (2006.01) |
| B60R 19/34 | (2006.01) |

(52) U.S. Cl.
CPC .............. *B62D 21/02* (2013.01); *B60R 19/34* (2013.01); *B62D 21/15* (2013.01); *B62D 25/00* (2013.01); *F16F 7/12* (2013.01)

(58) Field of Classification Search
CPC ....... B60R 19/18; B60R 19/34; B62D 23/005; B62D 21/15; F16F 7/12
See application file for complete search history.

(56) References Cited

U.S. PATENT DOCUMENTS

| | | | |
|---|---|---|---|
| 1,951,292 A | 3/1934 | Cahill | |
| 2,205,893 A | 6/1940 | Unger | |
| 2,340,003 A * | 1/1944 | McDermott | E04C 3/32 52/843 |
| 2,837,347 A | 6/1958 | Barenyi | |
| 2,856,226 A | 10/1958 | Purdy | |
| 3,092,222 A | 6/1963 | Heinle | |
| 3,209,432 A | 10/1965 | Cape | |

(Continued)

FOREIGN PATENT DOCUMENTS

| | | |
|---|---|---|
| CN | 104443039 A | 3/2015 |
| CN | 104763772 A | 7/2015 |

(Continued)

OTHER PUBLICATIONS

Machine translation of JP '493.*

(Continued)

*Primary Examiner* — Hilary L Gutman
(74) *Attorney, Agent, or Firm* — Jones Robb, PLLC; Vichit Chea

(57) ABSTRACT

A strengthening member for a motor vehicle, the strengthening member has a cross section that comprises sixteen corners and includes sides and corners creating eight internal angles and eight external angles. Each internal angle ranges between about 90° and about 145° and each external angle ranges between about 95° and about 175°. One or more tunable parameters of a cross section can vary along a longitudinal axis of the strengthening member.

18 Claims, 23 Drawing Sheets

$S_j$: LENGTH OF SIDE j
$T_j$: THICKNESS OF SIDE j
$\vartheta_{ij}$: INTERNAL ANGLE j
$\vartheta_{ej}$: EXTERNAL ANGLE j

(56) References Cited

U.S. PATENT DOCUMENTS

| | | |
|---|---|---|
| 3,366,530 A | 1/1968 | Kodich |
| 3,412,628 A | 11/1968 | De Gain |
| 3,930,658 A | 1/1976 | Howe et al. |
| 3,964,527 A | 6/1976 | Zwart |
| 4,018,055 A | 4/1977 | Clercq |
| 4,021,983 A | 5/1977 | Kirk, Jr. |
| 4,029,350 A | 6/1977 | Goupy et al. |
| 4,056,878 A | 11/1977 | Woodley |
| 4,227,593 A | 10/1980 | Bricmont et al. |
| 4,249,976 A | 2/1981 | Hudson |
| 4,352,484 A | 10/1982 | Gertz et al. |
| 4,364,216 A | 12/1982 | Koller |
| 4,667,530 A | 5/1987 | Mettler et al. |
| 4,702,515 A | 10/1987 | Kato et al. |
| 5,069,318 A | 12/1991 | Kulesha et al. |
| 5,100,730 A | 3/1992 | Lambers |
| 5,242,735 A | 9/1993 | Blankenburg et al. |
| 5,271,204 A | 12/1993 | Wolf et al. |
| 5,431,445 A | 7/1995 | Wheatley |
| 5,480,189 A | 2/1996 | Schechter |
| 5,618,633 A | 4/1997 | Swanson et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,635,202 B1 | 10/2003 | Bugg et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,893,065 B2 | 3/2005 | Seksaria et al. |
| 6,959,894 B2 | 11/2005 | Hayashi |
| 7,044,515 B2 | 5/2006 | Mooijman et al. |
| 7,160,621 B2 | 1/2007 | Chaudhari et al. |
| 7,252,314 B2 | 8/2007 | Tamura et al. |
| 7,264,274 B2 | 9/2007 | Ridgway |
| 7,303,219 B2 | 12/2007 | Trabant et al. |
| 7,350,851 B2 | 4/2008 | Barvosa-Carter et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,678,440 B1 | 3/2010 | McKnight et al. |
| 7,896,411 B2 | 3/2011 | Kano et al. |
| 7,926,160 B2 | 4/2011 | Zifferer et al. |
| 7,926,865 B2 | 4/2011 | Terada et al. |
| 7,988,809 B2 | 8/2011 | Smith et al. |
| 8,336,933 B2 | 12/2012 | Nagwanshi et al. |
| 8,354,175 B2 | 1/2013 | Impero |
| 8,438,808 B2 | 5/2013 | Carlson et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,573,571 B2 | 11/2013 | Langhorst et al. |
| 8,641,129 B2 | 2/2014 | Tyan et al. |
| 8,659,659 B2 | 2/2014 | Bradai et al. |
| 9,073,582 B2 | 7/2015 | Tyan et al. |
| 9,174,678 B2 | 11/2015 | Tyan et al. |
| 9,187,127 B2 | 11/2015 | Tyan et al. |
| 9,365,245 B2 | 6/2016 | Donabedian et al. |
| 9,533,710 B2 | 1/2017 | Cheng et al. |
| 9,789,906 B1 | 10/2017 | Tyan |
| 9,840,281 B2 | 12/2017 | Tyan et al. |
| 9,845,112 B2 | 12/2017 | Tyan et al. |
| 9,889,887 B2 | 2/2018 | Tyan et al. |
| 9,944,323 B2 | 4/2018 | Tyan et al. |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0249342 A1 | 9/2006 | Canot et al. |
| 2007/0056819 A1 | 3/2007 | Kano et al. |
| 2007/0114804 A1 | 5/2007 | Gross et al. |
| 2008/0012386 A1 | 1/2008 | Kano et al. |
| 2008/0014809 A1 | 1/2008 | Brown et al. |
| 2008/0030031 A1 | 2/2008 | Nilsson et al. |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0164864 A1 | 7/2008 | Bjorn |
| 2008/0185852 A1 | 9/2008 | Suzuki et al. |
| 2008/0217935 A1 | 9/2008 | Braunbeck et al. |
| 2009/0026777 A1 | 1/2009 | Schmid et al. |
| 2009/0085362 A1 | 4/2009 | Terada et al. |
| 2009/0092820 A1 | 4/2009 | Lambers |
| 2009/0102234 A1 | 4/2009 | Heatherington et al. |
| 2009/0174219 A1 | 7/2009 | Foreman |
| 2009/0236166 A1 | 9/2009 | Kowaki et al. |
| 2010/0064946 A1 | 3/2010 | Watson |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2010/0164238 A1 | 7/2010 | Nakanishi et al. |
| 2011/0012389 A1 | 1/2011 | Kanaya et al. |
| 2011/0015902 A1 | 1/2011 | Cheng et al. |
| 2011/0024250 A1 | 2/2011 | Kitashiba et al. |
| 2011/0102592 A1 | 5/2011 | Bradai et al. |
| 2011/0187135 A1 | 8/2011 | Kano et al. |
| 2011/0223372 A1 | 9/2011 | Metz et al. |
| 2011/0226312 A1 | 9/2011 | Bohm et al. |
| 2012/0205927 A1 | 8/2012 | Asakawa et al. |
| 2012/0261949 A1 | 10/2012 | Tyan et al. |
| 2013/0140850 A1 | 6/2013 | Tyan et al. |
| 2013/0193699 A1 | 8/2013 | Zannier |
| 2013/0221692 A1 | 8/2013 | Wang et al. |
| 2013/0264757 A1 | 10/2013 | Rajasekaran et al. |
| 2013/0292968 A1 | 11/2013 | Tyan et al. |
| 2013/0300138 A1 | 11/2013 | Banasiak et al. |
| 2013/0341115 A1 | 12/2013 | Tyan et al. |
| 2014/0021709 A1 | 1/2014 | Hirose et al. |
| 2014/0127454 A1 | 5/2014 | Kuppers |
| 2014/0203577 A1 | 7/2014 | Nagwanshi et al. |
| 2014/0261949 A1 | 9/2014 | Marella et al. |
| 2014/0353990 A1 | 12/2014 | Ishitobi et al. |
| 2015/0001866 A1* | 1/2015 | Noyori .................. F16F 7/125 293/133 |
| 2015/0084374 A1 | 3/2015 | Tyan et al. |
| 2015/0197206 A1 | 7/2015 | Tamura et al. |
| 2015/0247298 A1 | 9/2015 | Li et al. |
| 2015/0314743 A1 | 11/2015 | Matsushiro |
| 2016/0001725 A1 | 1/2016 | Nakanishi et al. |
| 2016/0001726 A1 | 1/2016 | Keller et al. |
| 2016/0052557 A1 | 2/2016 | Tyan et al. |
| 2016/0068194 A1 | 3/2016 | Tyan et al. |
| 2016/0129866 A1 | 5/2016 | Kamiya |
| 2016/0221521 A1 | 8/2016 | Nishimura et al. |
| 2016/0264083 A1 | 9/2016 | Ishitsuka |
| 2016/0375935 A1 | 12/2016 | Tyan et al. |
| 2017/0106915 A1 | 4/2017 | Tyan et al. |
| 2017/0113724 A1 | 4/2017 | Tyan et al. |
| 2017/0203790 A1 | 7/2017 | Tyan et al. |
| 2017/0274933 A1* | 9/2017 | Tyan ...................... B60R 19/34 |
| 2017/0307137 A1 | 10/2017 | Tyan et al. |
| 2017/0307138 A1 | 10/2017 | Tyan |
| 2018/0057058 A1 | 3/2018 | Tyan |
| 2018/0057060 A1 | 3/2018 | Tyan et al. |
| 2018/0057063 A1 | 3/2018 | Tyan et al. |
| 2018/0058530 A1 | 3/2018 | Tyan |
| 2018/0099475 A1 | 4/2018 | Tyan et al. |
| 2018/0099696 A1 | 4/2018 | Tyan et al. |
| 2018/0100621 A1 | 4/2018 | Tyan et al. |

FOREIGN PATENT DOCUMENTS

| | | | |
|---|---|---|---|
| CN | 104890308 A | 9/2015 | |
| CN | 105235616 A | 1/2016 | |
| DE | 102005037055 A1 | 2/2007 | |
| DE | 102009035782 A1 * | 3/2010 | ............ B21D 53/88 |
| EP | 0856681 A1 | 8/1998 | |

(56) References Cited

FOREIGN PATENT DOCUMENTS

| | | |
|---|---|---|
| FR | 2375496 A2 | 7/1978 |
| GB | 1123337 A | 8/1968 |
| JP | 04-371059 A | 12/1992 |
| JP | 08-337183 | 12/1996 |
| JP | 3897542 B2 | 1/2007 |
| JP | 2007-023661 A | 2/2007 |
| JP | 2008168745 A | 7/2008 |
| JP | 2008261493 A | 10/2008 |
| JP | 2009184417 A | 8/2009 |
| JP | 2011051581 A * | 3/2011 |
| JP | 2012107660 A | 6/2012 |
| JP | 5348910 B2 | 8/2013 |
| JP | 2013159132 A | 8/2013 |
| JP | 2014004973 A | 1/2014 |
| JP | 2015124784 A | 7/2015 |
| RU | 2246646 C2 | 2/2005 |
| WO | 92009766 A1 | 6/1992 |

OTHER PUBLICATIONS

Yoshiaki Nakazawa et al., "Development of Crash-Box for Passenger Car With High Capability for Energy Absorption", VIII International Conference on Computational Plasticity (COMPLAS VIII), Barcelona, 2005.
Extended European Search Report for Application No. 15195185.2, dated May 19, 2016.
Office Action dated Dec. 17, 2015 from U.S. Appl. No. 12/891,801.
PABR filed on Mar. 17, 2016 PABR in Response to NFOA dated Dec. 17, 2015 from U.S. Appl. No. 12/891,801.
Machine Translation of JP08-337183.
JP08-337183 English Abstract.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Translation of JP04-371059.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
Office Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 11, 2011 Response to Office Action dated Aug. 19, 2011 from U.S. Appl. No. 12/233,808.
Office Action dated Mar. 7, 2012 from U.S. Appl. No. 12/233,808.
Jun. 6, 2012 Response to Office Action dated Mar. 7, 2012 from U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Advisory Action dated May 6, 2013 from co-pending U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Non-Final Office Action dated Jun. 12, 2018 from U.S. Appl. No. 15/251,099.
Non-Final Office Action dated Jun. 22, 2018 from U.S. Appl. No. 15/244,450.
Notice of Allowance dated Jun. 22, 2018 from U.S. Appl. No. 15/248,136.
Non-Final Office Action dated Jul. 24, 2018, from U.S. Appl. No. 15/138,466.
Final Office Action dated Aug. 31, 2018, from U.S. Appl. No. 15/395,524.
Non-Final Office Action dated Sep. 26, 2018, from U.S. Appl. No. 15/138,465.
Notice of Allowance dated Oct. 11, 2018 from U.S. Appl. No. 15/248,136.
Non-Final Office Action dated Feb. 22, 2017 from U.S. Appl. No. 15/078,517.
Notice of Allowance dated Jun. 5, 2017 from U.S. Appl. No. 15/078,517.
Non-Final Office Action dated Feb. 7, 2017 from U.S. Appl. No. 14/923,802.
Non-Final Office Action dated Mar. 20, 2017 from U.S. Appl. No. 15/001,668.
Non-Final Office Action dated Nov. 1, 2016 from U.S. Appl. No. 14/930,299.
Final Office Action dated May 16, 2017 from U.S. Appl. No. 14/930,299.
Non-Final Office Action dated Jan. 23, 2017 from U.S. Appl. No. 14/942,385.
Final Office Action dated May 15, 2017 from U.S. Appl. No. 14/942,385.
Notice of Allowance dated Aug. 4, 2017 from U.S. Appl. No. 14/942,385.
Final Office Action dated Aug. 25, 2017 from U.S. Appl. No. 14/923,802.
Notice of Allowance dated Aug. 10, 2017 from U.S. Appl. No. 14/930,299.
Notice of Allowance dated Oct. 4, 2017 from U.S. Appl. No. 15/001,668.
Non-Final Office Action dated Nov. 30, 2017 from U.S. Appl. No. 15/248,136.

(56) References Cited

OTHER PUBLICATIONS

Notice of Allowance dated Dec. 4, 2017 from U.S. Appl. No. 14/923,802.
Non-Final Office Action dated Feb. 12, 2018 from U.S. Appl. No. 15/395,524.
Final Office Action dated Nov. 15, 2018 from U.S. Appl. No. 15/244,450.
Notice of Allowance dated Nov. 16, 2018 from U.S. Appl. No. 15/251,029.
Non-Final Office Action dated Nov. 28, 2018 from U.S. Appl. No. 15/395,524.
Notice of Allowance dated Dec. 20, 2018 from U.S. Appl. No. 15/138,466.
Non-Final Office Action dated Dec. 21, 2018 from U.S. Appl. No. 15/291,465.
Notice of Allowance dated Jan. 14, 2019, from U.S. Appl. No. 15/251,099.
Non-Final Office Action dated Jan. 18, 2019, from U.S. Appl. No. 15/291,486.

\* cited by examiner

SIXTEEN-CORNERED STRENGTHENING MEMBER FOR VEHICLES

TECHNICAL FIELD

The present disclosure relates generally to a strengthening member for a vehicle body or other structures. The present closure relates more specifically to a strengthening member having a sixteen-cornered cross section and to motor vehicles including a strengthening member having a sixteen-cornered cross section.

BACKGROUND

It is desirable, for vehicle strengthening members, to maximize impact energy absorption and bending resistance while minimizing mass per unit length of the strengthening member. Impact energy absorption may be maximized, for example, by assuring that the strengthening member compacts substantially along a longitudinal axis of the strengthening member upon experiencing an impact along this axis. Such longitudinal compaction may be referred to as a stable axial crush of the strengthening member.

When a compressive force is exerted on a strengthening member, for example, by a force due to a front impact load on a vehicle's front rail or other strengthening member in the engine compartment, the strengthening member can crush in a longitudinal direction to absorb the energy of the collision. In addition, when a bending force is exerted on a strengthening member, for example, by a force due to a side impact load on a vehicle's front side sill, B-pillar or other strengthening member, the strengthening member can bend to absorb the energy of the collision.

Conventional strengthening members rely on increasing the thickness and hardness of side and/or corner portions to improve crush strength. However, such increased thickness and hardness increases weight of the strengthening member and reduces manufacturing feasibility. It may be desirable to provide a strengthening assembly configured to achieve the same or similar strength increase as provided by the thickened sides and/or corners, while minimizing mass per unit length of the member, and maintaining a high manufacturing feasibility.

It may further be desirable to provide a strengthening member that can achieve increased energy absorption and a more stable axial collapse when forces such as front and side impact forces are exerted on the strengthening member, while also conserving mass to reduce vehicle weights and meet emission requirements. Also, it may be desirable to provide a strengthening member that can achieve improved energy absorption and bend when a bending force is exerted on the strengthening member. Additionally, it may be desirable to provide a strengthening member that possesses improved noise-vibration-harshness performance due to work hardening on its corners. In addition, it may be desirable, to provide a tunable strengthening member cross section configured to achieve strength increases (i.e., load carrying and energy absorption) over basic polygonal designs, while also allowing flexibility in design to meet a range of vehicle applications.

SUMMARY

In accordance with various exemplary embodiments of the present disclosure, a strengthening member for a motor vehicle is provided. The strengthening member has a sixteen-cornered cross section comprising sixteen corners and including sides and corners creating eight internal angles and eight external angles. Each internal angle ranges between about 90° and about 145°. Each external angle ranges between about 95° and about 175°.

In accordance with another aspect of the present disclosure, a strengthening member for a motor vehicle comprises a cross section comprising sixteen corners and including sides and corners creating eight internal angles and eight external angles. The strengthening member has a longitudinal axis, and the strengthening member tapers along the longitudinal axis.

In accordance with a further aspect of the present disclosure, a vehicle comprises a strengthening member. The strengthening member comprises a sixteen-cornered cross section including sixteen corners and including sides and corners creating eight internal angle corners and eight external angle corners.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein.

Figure 1:
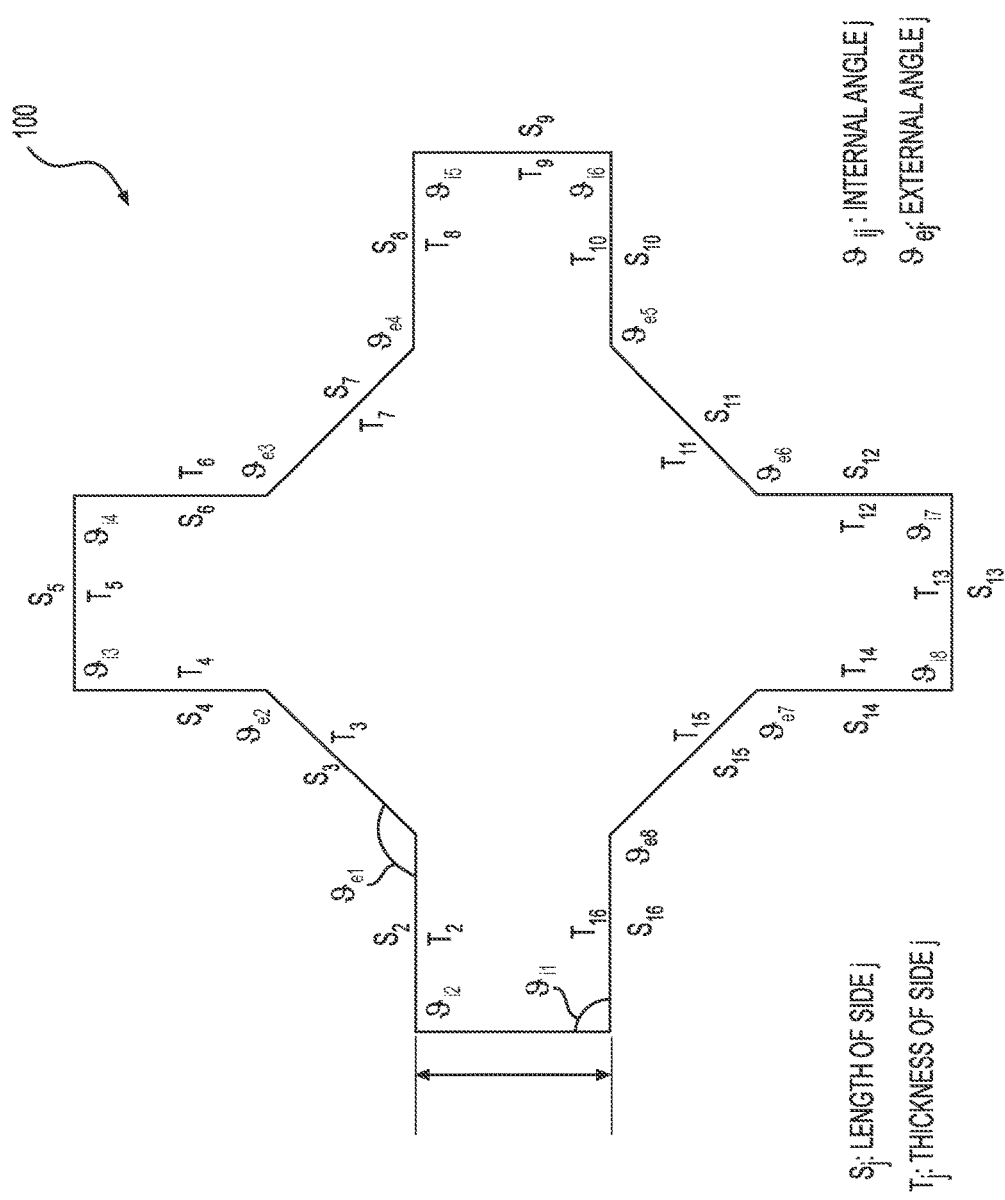
FIG. 1 illustrates an exemplary embodiment of a sixteen-cornered cross section of a strengthening member, with the strengthening member having eight internal angles and eight external angles in accordance with the present teachings.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

The present teachings contemplate strengthening members with sixteen-cornered cross sections having substantially increased stiffness throughout the sides and corners without increasing thickness within the corners as done in conventional strengthening members. The strengthening members of the present disclosure are designed based in part on, for example, a variety of tunable parameters configured to achieve strength increases (i.e., load carrying and energy absorption) over basic polygonal designs (e.g., polygonal strengthening member cross sections having less or the same number of sides), while also allowing design flexibility to meet a range of vehicle applications.

In accordance with the present teachings, the shape of the strengthening members disclosed herein provides the strengthening member with stabilized folding, reduced crush distance, and increased energy absorption in response to an axially applied crash force. The shape also improves moisture shedding abilities of the strengthening member and permits a more customized fit with other vehicle components.

The strengthening members in accordance with the present teachings can achieve increased energy absorption and a more stable axial collapse when forces such as front and side impact forces are exerted on the strengthening member. Furthermore, the side lengths and configurations, and/or degrees of the internal and external angles, of the strengthening members in accordance with the present teachings can achieve a similar, if not greater, strength increase as thickened corners, while minimizing mass per unit length of the member and maintaining a high manufacturing feasibility because the member can be formed by stamping, bending, press forming, hydro-forming, molding, casting, extrusion, uniform or non-uniform roll forming, machining, forging, and/or other known manufacturing processes. Thus-formed sections can be joined via welding, brazing, soldering, adhesive bonding, fastening, press fitting or other known joining technologies.

Strengthening members in accordance with the present teachings can comprise, for example, traditional steels, advanced high strength steels (AHSS), ultra high strength steels (UHSS), new/next generation high strength steels (NGHSS), titanium alloys, aluminum alloys, magnesium alloys, nylons, plastics, composites, hybrid materials or any other suitable materials. Those of ordinary skill in the art would understand, for example, that the material used for a strengthening member may be chosen based at least in part on intended application, strength/weight considerations, cost, packaging space, and/or other design factors.

An exemplary embodiment of a sixteen-cornered cross section of a strengthening member 100 in accordance with the present teachings is illustrated in FIG. 1. The strengthening member 100 has sixteen sides. The illustrated cross section of the strengthening member 100 comprises sixteen sides having lengths $S_1$-$S_{16}$ and thicknesses $T_1$-$T_{16}$, eight internal corners with angles $\vartheta_{i1}$-$\vartheta_{i8}$, and eight external corners with angles $\vartheta_{e1}$-$\vartheta_{e8}$.

The perimeter of the sixteen-sided cross section generally forms a polygon comprising a plurality of internal and external corners. As embodied herein and shown in FIG. 1, the polygon may be formed of alternating internal and external angles, and in particular, may be formed by alternating two consecutive internal corners/angles with two consecutive external corners/angles. This repeating pattern, which alternates between two consecutive internal corners/angles and two consecutive external corners/angles (i.e., an alternating two-in-two-out configuration), results in a cross section with up to four bisecting planes of symmetry. Under an axial and symmetric loading condition, strengthening members with symmetrical, polygonal cross sections, including the various embodiments of the present teachings, may have better load carrying capabilities and energy absorbing capabilities than those with asymmetrical, polygonal cross sections with an equivalent number of corners and sides. Furthermore, strengthening members with symmetrical, polygonal cross sections with more than two bisecting planes of symmetry (e.g., three bisecting planes of symmetry, or four-or-more bisecting planes of symmetry), including the various embodiments of the present teachings, may have better load carrying capabilities and energy absorbing capabilities than those with symmetrical, polygonal cross sections with two or fewer bisecting planes of symmetry and an equivalent number of corners and sides. However, as those of skill in the art will understand, use of asymmetrical cross-sections may offer other benefits that provide advantages that cannot be realized using a symmetrical cross-section. The present disclosure contemplates that a sixteen-sided, sixteen-cornered cross-section, in accordance with the present teachings, may be either symmetrical or asymmetrical.

Depending upon the particular application and/or the desired features of the strengthening member, the lengths of the sides and the thicknesses of the sides of the sixteen-sided, sixteen-cornered strengthening member as well as the internal and external corner angles of the strengthening member can be varied (i.e., can be tuned) to achieve improved strength and other performance features (e.g., stability of folding pattern) compared to conventional strengthening member cross sections. Varying these features of the sixteen-sided, sixteen-cornered strengthening member may obviate the need for increased side and/or corner thickness. In accordance with various exemplary embodiments of the present teachings, the lengths of sides $S_1$-$S_{16}$, the thicknesses $T_1$-$T_{16}$ of the sides as well as the internal angles $\vartheta_{i1}$-$\vartheta_{i8}$ and external angles $\vartheta_{e1}$-$\vartheta_{e8}$ of the corner angles can be varied to a certain degree, as would be understood by one skilled in the art, for example in accordance with available packaging space within a vehicle.

In addition, in a strengthening member in accordance with the present teachings, each internal corner angle $\vartheta_{i1}$-$\vartheta_{i8}$ of the strengthening member can range from about 90° to about 145°, and each external corner angle $\vartheta_{e1}$-$\vartheta_{e8}$ of the strengthening member can range from about 95° to about 175°. In accordance with the present teachings, the internal angles $\vartheta_{i1}$-$\vartheta_{i8}$ of the strengthening member may all be substantially the same, and similarly, the external angles $\vartheta_{e1}$-$\vartheta_{e8}$ of the strengthening member may all be substantially the same. Additionally, the present teachings contemplate embodiments for which one, some, or all of the internal angle(s) $\vartheta_{i1}$-$\vartheta_{i8}$ are right angles. Additionally or alternatively, the present disclosure contemplates embodiments in which at least some of the internal angles $\vartheta_{i1}$-$\vartheta_{i8}$ of the strengthening member differ from one another, and similarly, at least some of the external angles $\vartheta_{e1}$-$\vartheta_{e8}$ of the strengthening member differ from one another. FIG. 1 illustrates an exemplary embodiment in which all of the internal angles $\vartheta_{i1}$-$\vartheta_{i8}$ are about 90°, all of the external corner angles $\vartheta_{e1}$-$\vartheta_{e8}$ are about 135°, and the aspect ratio is 1:1.

In certain exemplary embodiments of the present disclosure, such as in an automotive application, for example, a length of each side $S_1$-$S_{16}$ of the strengthening member can range from about 10 mm to about 250 mm. In other exemplary embodiments, such as in an aircraft, spacecraft, watercraft, or building application, for example, a length of each side $S_1$-$S_{16}$ of the strengthening member may be larger.

In certain exemplary embodiments of the present disclosure, such as in an automotive application, for example, a thickness $T_1$-$T_{16}$ of the sides of the strengthening member can range from about 0.6 mm to about 6.0 mm. In other exemplary embodiments of the strengthening member, such as in an aircraft, spacecraft, watercraft, or building application, for example, a thickness $T_1$-$T_{16}$ of the sides of the strengthening member may be larger. In one exemplary embodiment, a thickness $T_1$-$T_{16}$ of each of the sides of the strengthening member may be about 3.3 mm. In another exemplary embodiment, a thickness $T_1$-$T_{16}$ of each of the sides may be about 2.3 mm. In another exemplary embodiment, a thickness $T_1$-$T_{16}$ of each of the sides may be about 2.2 mm. In some exemplary embodiments, the thickness $T_1$-$T_{16}$ of the sides is substantially the same as the thickness of the corners for each side. In some exemplary embodiments the thickness $T_1$-$T_{16}$ of each side wall, (e.g., side walls 202A-202P (see FIG. 2A)), can vary with respect to each other side wall. Alternatively or concurrently, the thickness $T_1$-$T_{16}$ can vary within each length of the sides $S_1$-$S_{16}$.

Figure 2A:
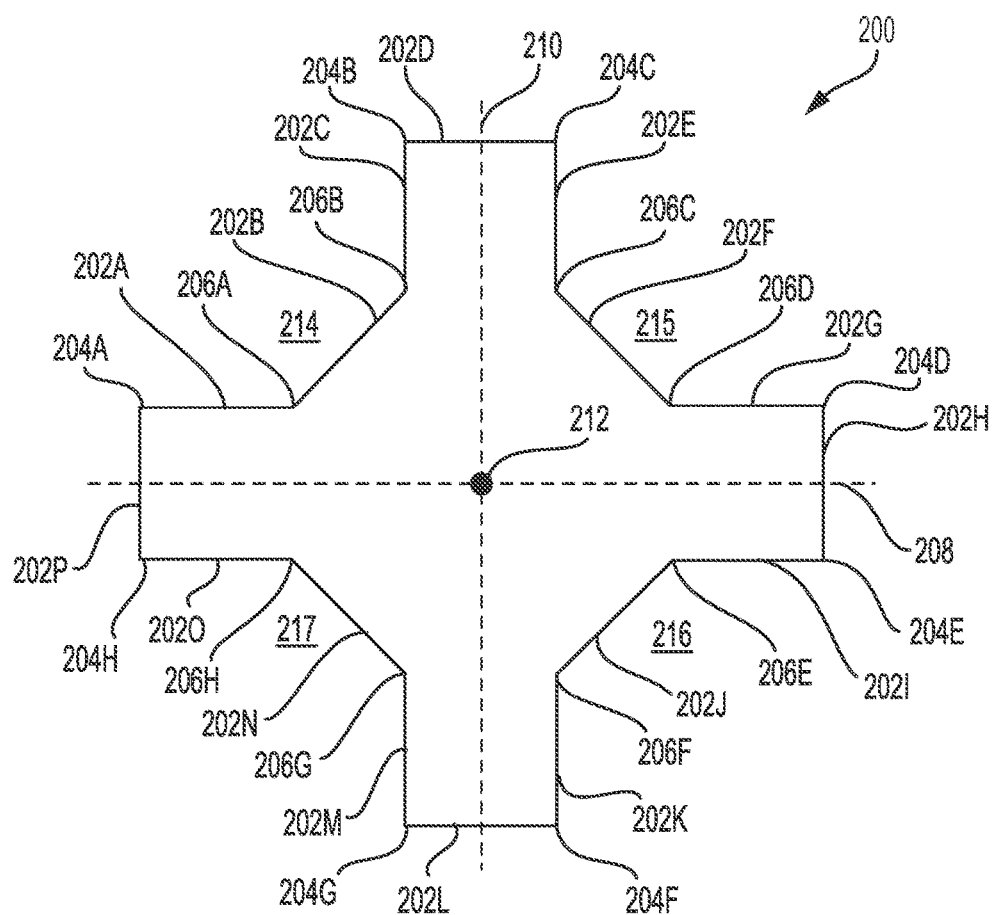
FIGS. 2A-2B illustrate top and perspective views of a first exemplary embodiment of a strengthening member having a sixteen-cornered cross section, with eight internal angles and eight external angles, as shown in FIG. 1.
Figure 2B:
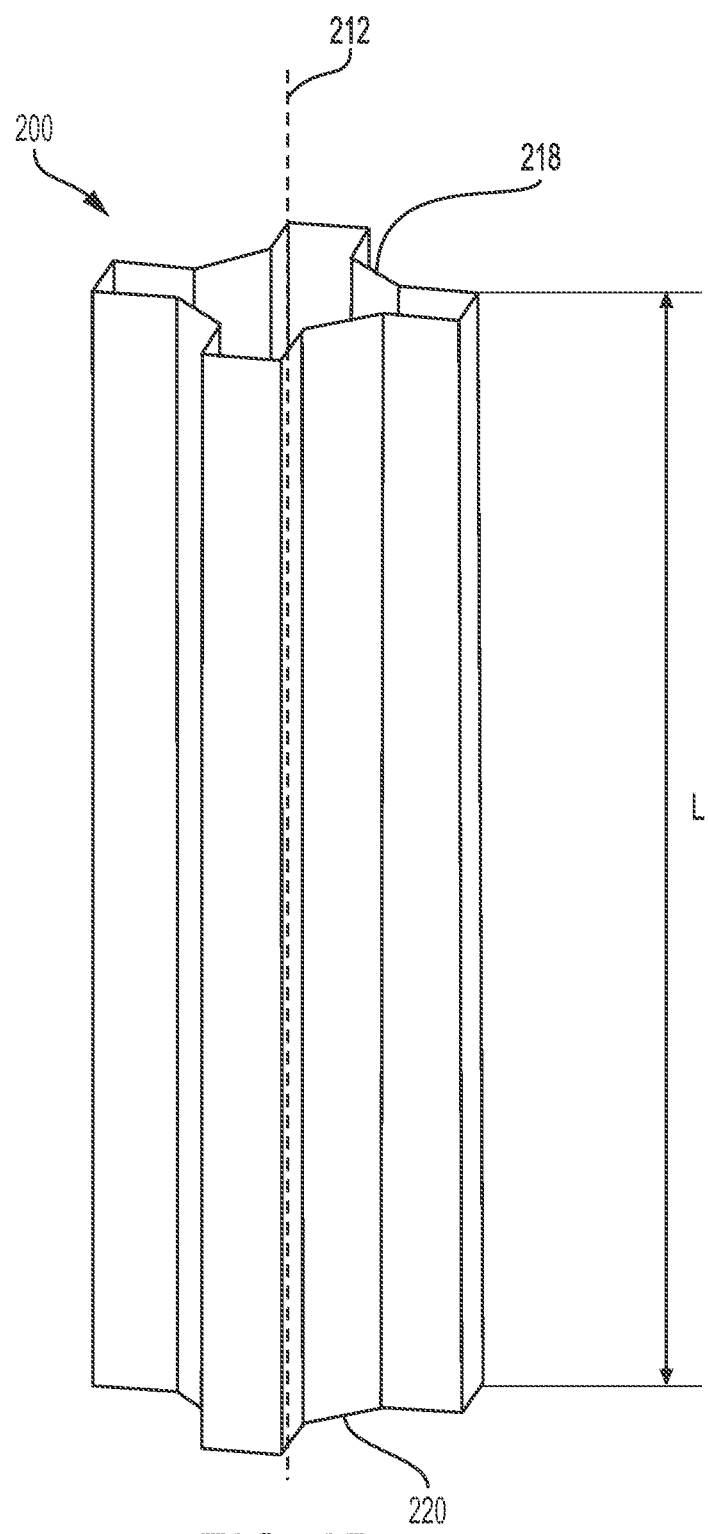

Top and perspective views of a first exemplary embodiment of a strengthening member 200 having a sixteen-cornered cross section, with eight internal angles and eight external angles are illustrated in FIGS. 2A-2B. Strengthening member 200 has sixteen corners 204A-H and 206A-H and sixteen side walls 202A-202P. Eight of the corners are internal angle corners 204A-204H and eight of the corners are external angle corners 206A-206H. Strengthening member 200 also has a first transverse axis 208, a second transverse axis 210, and a longitudinal axis 212. Although shown with its longitudinal axis 212 positioned substantially vertically, when strengthening member 200 (as well as all of the other various embodiments in accordance with the present teachings) is installed within a vehicle, the longitudinal axis 212 of the strengthening member may be oriented substantially horizontally. When installed in such a position, the shape of strengthening member 200 facilitates reducing or preventing moisture collecting or pooling along portions of the walls of the strengthening member. For example, certain conventional strengthening members whose walls form adjacent external angles of 90 degrees or form rectangular, square, or u-shaped recesses or depressions may collect moisture or permit moisture to pool in the recesses, increasing the possibility of weakening of the strengthening member via rusting, stripping, cracking, etc. (i.e., any form of oxidation or other chemical or physical distortion which the material of manufacture of the strengthening member may be more susceptible to due to the presence of moisture).

In contrast, a strengthening member formed in accordance with the present teachings does not include a recessed portion in which liquids or moisture remain for a long period of time. In particular, the walls of the strengthening member are angled relative to one another to promote shedding of any moisture or fluid that falls within any recessed portion of the strengthening member. For example, as shown in FIGS. 2A and 2B, strengthening member 200 includes a first recessed portion 214 between side walls 202A and 202C. However, side walls 202A and 202C are connected by a sloped/angled side wall 202B in such a manner that fluid impinging or collecting on side wall 202B will run off side wall 202B and toward the ends of side wall 202A or 202C. Similarly, for example, as shown in FIGS. 2A and 2B, strengthening member 200 includes second recessed portion 215 between side walls 202E and 202G, third recessed portion 216 between side walls 202I and 202K, and fourth recessed portion 217 between side walls 202M and 202O.

The strengthening member 200 of FIGS. 2A-2B also has a uniform cross section along a length of the strengthening member 200, from a first end 218 to a second end 220 of the strengthening member 200. Additionally, the length of each side $S_1$-$S_{16}$ is approximately the same as illustrated in FIGS.

2A-2B. As also illustrated, each of the internal angles is substantially the same and each of the external angles is substantially the same. In particular, each internal angle is about 90° and each external angle is about 135°. The thicknesses of each sidewall 202A-202P are also substantially the same.

Figure 3A:
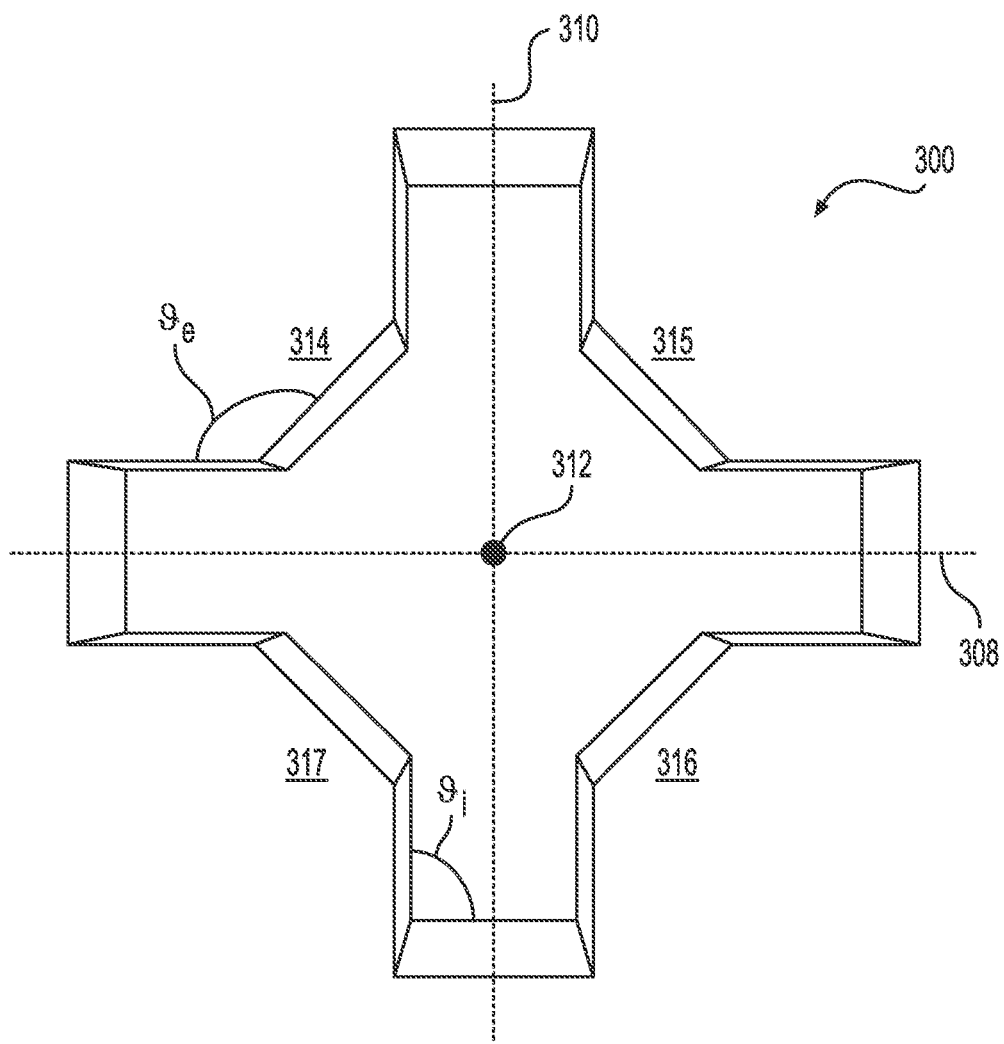
FIGS. 3A-3B illustrate top and perspective views of a second exemplary embodiment of a strengthening member having sixteen-cornered cross sections, with eight internal angles and eight external angles in accordance with the present teachings.
Figure 3B:
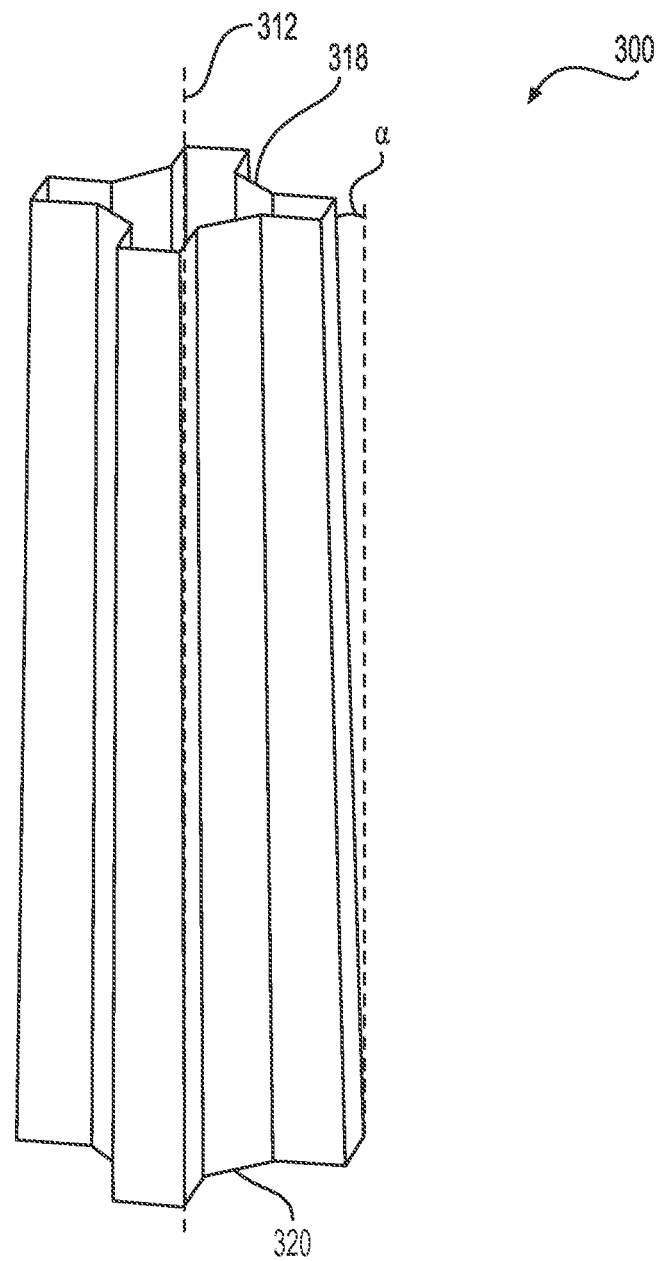

Top and perspective views of an alternative exemplary embodiment of a strengthening member 300 having a sixteen-cornered cross section, with eight internal angles and eight external angles, are illustrated in FIGS. 3A-3B. Strengthening member 300 differs from strengthening member 200 in several aspects. For example, as shown in FIGS. 3A and 3B, one or more of the side walls of the strengthening member may be angled with respect to the longitudinal axis 312 of the strengthening member to provide a taper to at least a portion of the shape of the strengthening member 300. As shown in FIGS. 3A-3B, strengthening member 300 is tapered along its length, from a first end 318 of the strengthening member 300 to a second end 320 of the strengthening member. The strengthening member 300 tapers along its length at an angle α, which can range from about 1° to about 65°. The degree of taper of each side wall may be substantially the same, or different side walls may exhibit differing degrees of taper. Tapering may be required due to component packaging constraints and/or to effectively couple, attach or otherwise bond other components to a strengthening member.

In the exemplary embodiment of FIGS. 3A-3B, all of the internal angles $\vartheta_i$ are about 90° and all of the external angles $\vartheta_e$ are about 135°. Also, as shown in FIGS. 3A-3B, strengthening member 300 includes recessed areas 314, 315, 316 and 317. Each recessed area 314, 315, 316 and 317 extends along the length of the strengthening member 300 from first end 318 to second end 320. In the disclosed exemplary embodiment of FIGS. 3A-3B, the lengths of the sides $S_1$-$S_{16}$ are each approximately the same as the other sides when taken at any cross section along the longitudinal length of the strengthening member 300. However, the length of each side gradually/incrementally increases along the longitudinal axis 312 of the strengthening member 300 from first end 318 to second end 320 to provide the tapered shape. As noted above, the embodiment of FIGS. 3A-3B is exemplary, and therefore all of the contemplated embodiments with variations to the lengths and thicknesses of the sides and to the angles of the internal and external corner angles of the sixteen-cornered cross sections, with eight internal angles and eight external angles, of the strengthening members in accordance with the present teachings are not shown in the figures, but based on the teachings herein, will be apparent to those of skill in the art.

Figure 4A:
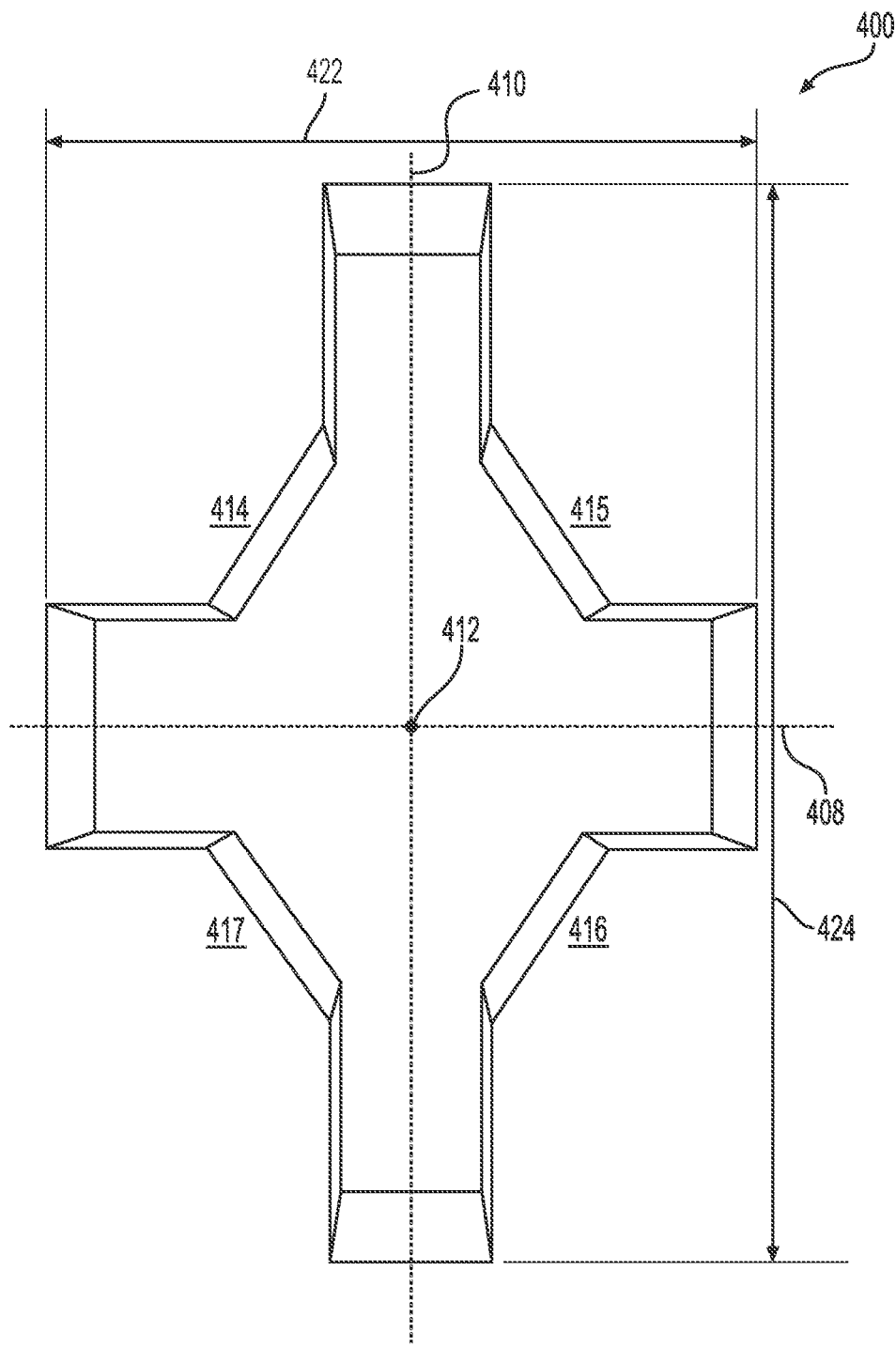
FIGS. 4A-4B illustrate top and perspective views of a third exemplary embodiment of a strengthening member having sixteen-cornered cross sections, with eight internal angles and eight external angles in accordance with the present teachings.
Figure 4B:
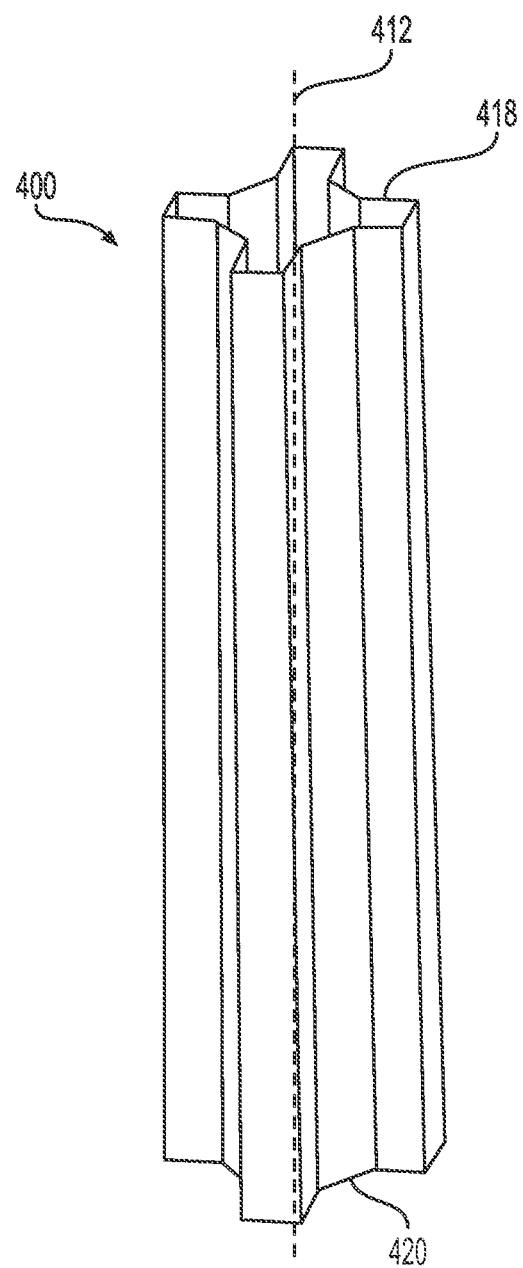

Top and perspective views of an alternative exemplary embodiment of a strengthening member 400 having the sixteen-cornered cross section, with eight internal angles and eight external angles, are illustrated in FIGS. 4A-4B. Similar to the strengthening member 300, strengthening member 400 tapers along its longitudinal axis 412 from a first end 418 of the strengthening member to a second end 420 of the strengthening member. However, as shown in FIGS. 4A-4B, strengthening member 400 differs from strengthening members 200 and 300 in that the dimension-to-dimension ratio of the cross section of the strengthening member, taken along transverse axes 408, 410 is not 1:1; rather, the aspect ratio is about 6.5:10.0. FIGS. 4A-4B illustrate a strengthening member that has a first length 422 along a first (minor) transverse axis 408 and a second length 424 along a second (major) transverse axis 410, where the second transverse axis is perpendicular to the first transverse axis. The aspect ratio of a strengthening member may be defined as [first length 422]:[second length 424]. In the exemplary embodiment of FIGS. 4A-4B, all of the internal corner angles are about the same, e.g., about 90°. In contrast, the external angles are not all same. In particular, as shown in FIG. 4A, external angles each of the external angles $\vartheta_{e1}$, $\vartheta_{e4}$, $\vartheta_{e5}$, and $\vartheta_{e8}$ have a first measurement, for example, about 123.5°, while external angles $\vartheta_{e2}$, $\vartheta_{e3}$, $\vartheta_{e6}$, and $\vartheta_{e7}$ have a second measurement, for example, about 145.5°. As also shown, the sides of the strengthening member 400 have differing lengths. Also, the strengthening member 400 of the exemplary embodiment shown in FIGS. 4A-4B includes recessed areas 414, 415, 416 and 417 spaced around the perimeter of the strengthening member and extending along the length of the strengthening member 400, each recessed area 414-417 extending from first end 418 to second end 420 of strengthening member 400. As noted above, the embodiment of FIGS. 4A-4B is exemplary, and therefore all of the contemplated embodiments with variations to the lengths of the sides, thicknesses of the sides, the angles of the internal and external corner angles, and the aspect ratio of the of the sixteen-cornered cross sections, with eight internal angles and eight external angles, of the strengthening members in accordance with the present teachings are not shown in the figures.

Figure 5A:
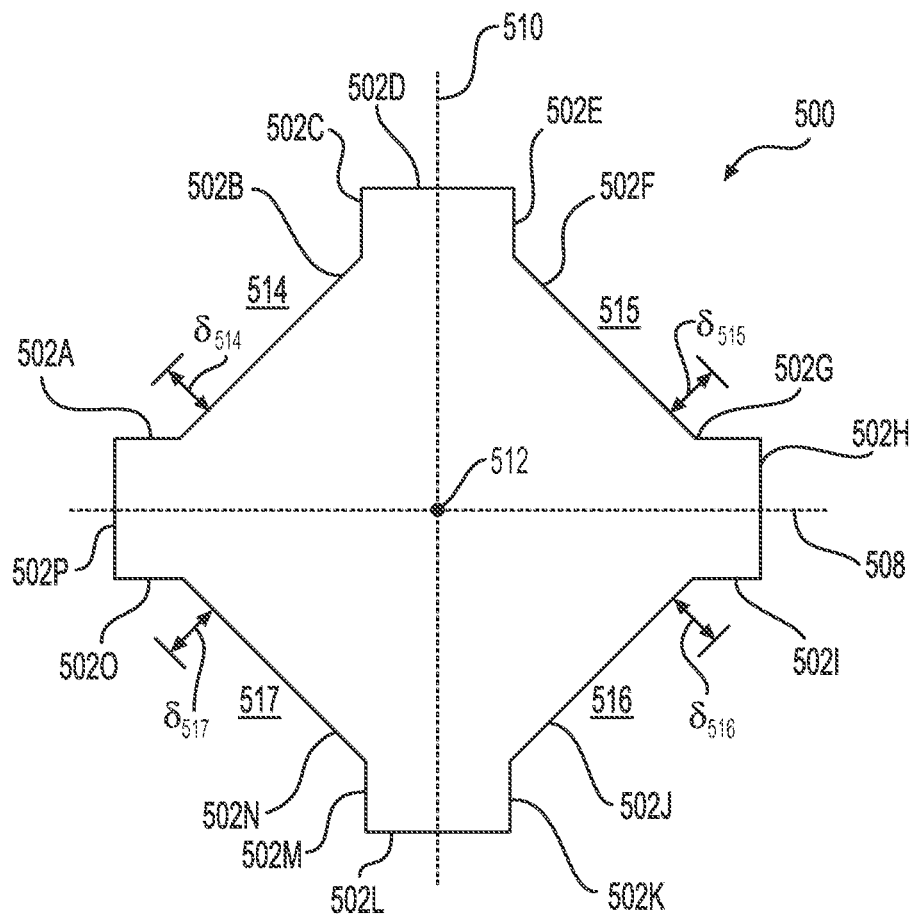
FIGS. 5A-5B illustrate top and perspective views of a fourth exemplary embodiment of a strengthening member having sixteen-cornered cross sections, with eight internal angles and eight external angles in accordance with the present teachings.
Figure 5B:
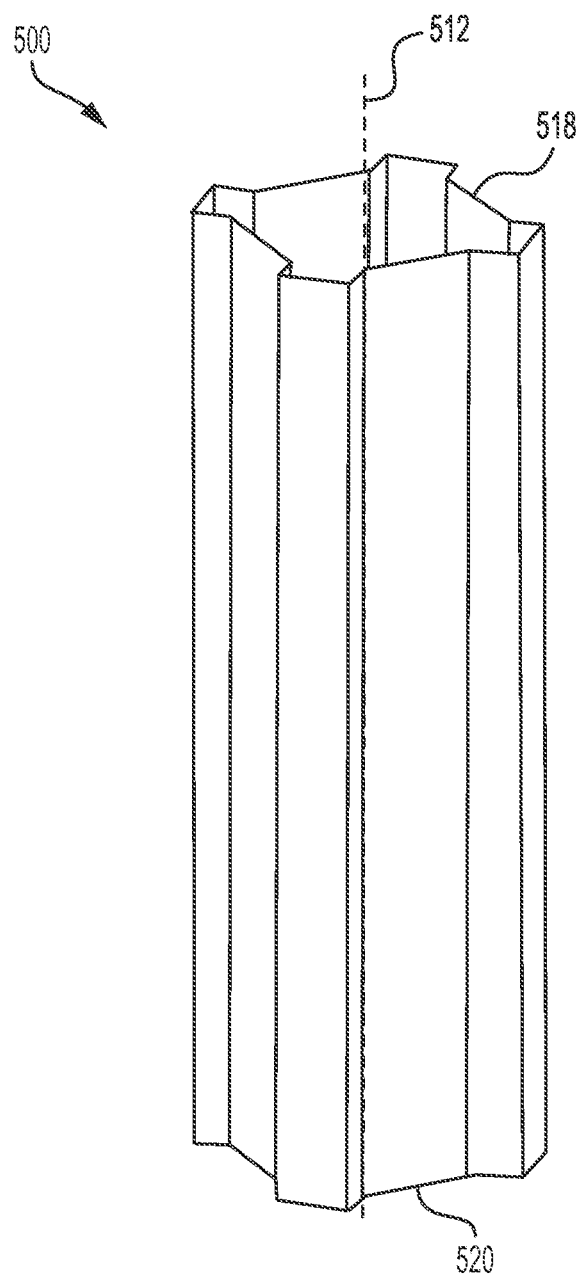

Top and perspective views of an alternative exemplary embodiment of a strengthening member 500 having the sixteen-cornered cross section, with eight internal angles and eight external angles, are illustrated in FIGS. 5A-5B. In the exemplary embodiment of FIGS. 5A-5B, each of the internal angles is about 90° and each of the external angles is about 135°. As illustrated in FIG. 5A, the lengths of side walls 502B, 502F, 502J, and 502N are greater in comparison to the lengths of side walls 502A, 502C-E, 502G-I, 502K-M, 502O and 502P. This difference in the lengths of the sides provides recessed areas 514, 515, 516 and 517, each of which extends along the length of the strengthening member 500 from first end 518 to second end 520 of the strengthening member. These recessed areas 514-517 each have a depth $\delta_{514}$-$\delta_{517}$, which is reduced (and may be considered relatively shallow) in comparison to the recessed areas shown in the strengthening members illustrated in FIGS. 2A-4B. This type of parameter tuning, i.e., changing the lengths of the sides to reduce the depth of the recess areas 514-517, can further improve the moisture shedding ability of the strengthening member 500. In particular, the combination of the decreased depth of the recessed area and the increased length of the sloped wall (floor) of the recessed area work together to direct moisture out of the recessed areas 514-517.

Figure 6A:
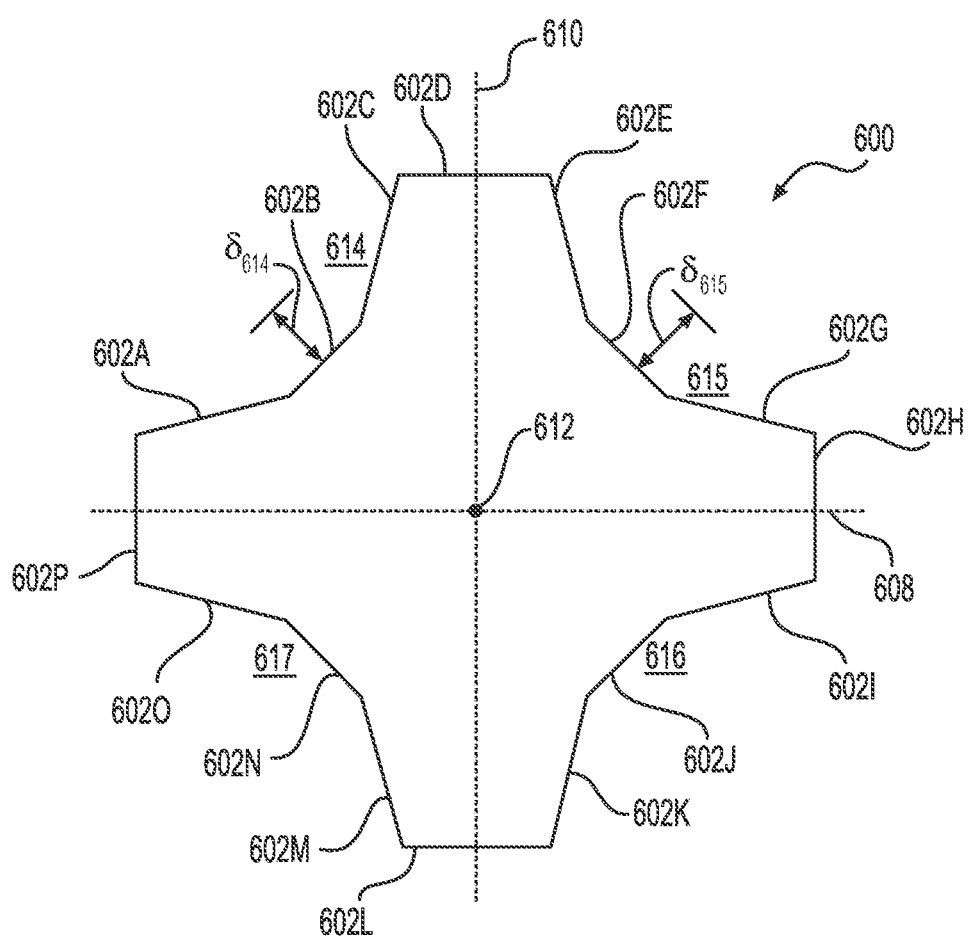
FIGS. 6A-6B illustrate top and perspective views of a fifth exemplary embodiment of a strengthening member having sixteen-cornered cross sections, with eight internal angles and eight external angles in accordance with the present teachings.
Figure 6B:
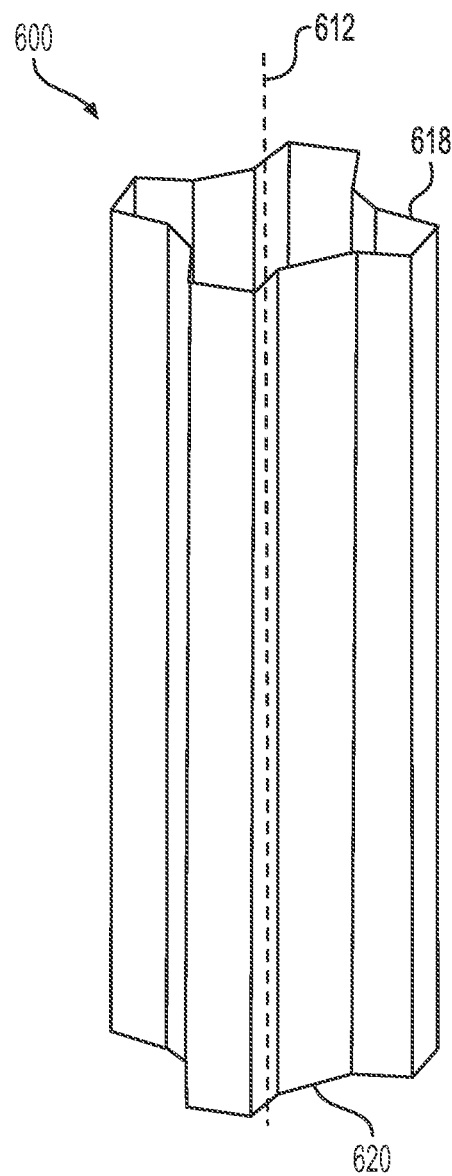

Top and perspective views of an alternative exemplary embodiment of a strengthening member 600 having the sixteen-cornered cross section, with eight internal angles and eight external angles, are illustrated in FIGS. 6A-6B. The strengthening member 600 of FIGS. 2A-2B has a uniform cross section along a longitudinal axis 612 of the strengthening member 600, from a first end 618 to a second end 620 of the strengthening member 200. The thickness of each sidewall 602A-602P is also substantially the same to each other side wall 602A-602P and throughout the longitudinal length of each side wall 602A-602P. However, the lengths of each side $S_1$-$S_{16}$ of each side wall 602A-602P are not all the same. For example, as shown in FIG. 6A, the cross-sectional lengths $S_j$ of side walls 602A, 602C, 602E, 602G, 602I, 602K, 602M and 602O are all substantially the same, however, they are different than the cross-sectional lengths $S_j$ of side walls 602B, 602F, 602J and 602N. Further, 602B, 602F, 602J and 602N are all substantially the same cross sectional length $S_j$, however the cross sectional lengths $S_j$ are different than those of 602D, 602H, 602L and 602P. The strengthening member 600 includes eight internal angles $\vartheta_{i1}$-$\vartheta_{i8}$ and eight external angles $\vartheta_{e1}$-$\vartheta_{e8}$. As shown in FIGS. 6A-6B, each of the internal angles is about 105° and each of the external angles is about 150°. In addition, and in contrast to the strengthening member 500 shown in FIGS. 5A-5B, the lengths of side walls 602B, 602F, 602J, and 602N are shorter in comparison to the lengths of side walls 602A, 602C-E, 602G-1, 602K-M, 602O and 602P. This difference in the lengths of the sides provides recessed areas 614-617, each of which extends along the length of the strengthening member 600 from first end 618 to second end 620 of the strengthening member 600. These recessed areas 614-617 have a depth $\delta_{614}$-$\delta_{617}$, respectively, which is increased (and may be considered relatively deep) in comparison to the recessed areas shown in the strengthening members illustrated in FIGS. 5A-5B. However, the increased depth of the recessed areas 614-617 may be compensated for by varying the internal and external angles of the strengthening member cross section. For example, as shown in FIGS. 6A-6B, increasing the internal angles to larger than 90 degrees results in a recessed area 614 in which all walls of the recessed portion are sloped. This configuration increases the ability of the recessed areas 614-617 of the strengthening member to shed moisture.

More generally, the various exemplary embodiments of the present teachings contemplate, for example, strengthening members with corners having different bend radii, with non-uniform cross sections, having non-symmetrical shapes, with sides having variable thicknesses, and/or having variable tapered sides. Various additional exemplary embodiments contemplate strengthening members that are bent and/or curved. Moreover, to further adjust a member's folding pattern and/or peak load capacity, various additional exemplary embodiments also contemplate strengthening members having trigger holes, flanges, and/or convolutions as would be understood by those of ordinary skill in the art. Combinations of one or more of the above described variations are also contemplated.

As discussed and embodied herein, the lengths $S_1$-$S_{16}$ and thicknesses $T_1$-$T_{16}$ of the sides of the strengthening member are tunable parameters of the strengthening member. The lengths $S_1$-$S_{16}$ and thicknesses $T_1$-$T_{16}$ of the sides may be tuned to provide desired characteristics in the strengthening member. For example, in the embodiment of FIGS. 3A-3B, these parameters are tuned to provide a strengthening member 300 with side walls and corners that are tapered along the longitudinal length of the strengthening member 300.

As discussed and embodied herein, the aspect ratio of a cross section of the strengthening member is a tunable parameter in accordance with the present teachings. The aspect ratio of a cross section of a strengthening member may be tuned to provide desired characteristics in the strengthening member. For example, in the embodiment of FIGS. 4A-4B, these parameters are tuned to provide a strengthening member 400 having two cross-sectional dimensions along perpendicularly oriented transverse axes that are substantially different in length the longitudinal length of the strengthening member 400.

As discussed and embodied herein, the lengths of the sides $S_1$-$S_{16}$ of the cross section is a tunable parameter in accordance with the present teachings. The lengths of the sides $S_1$-$S_{16}$ of a strengthening member may be tuned to provide desired characteristics in the strengthening member. For example, in the embodiment of FIGS. 5A-5B this parameter is tuned to provide a strengthening member 500 with recess areas 514-517 having particular depths $\delta_{514}$-$\delta_{517}$ that extend along the longitudinal length of the strengthening member 500.

As discussed and embodied herein, the eight internal angles $\vartheta_{i1}$-$\vartheta_{i8}$ and eight external angles $\vartheta_{e1}$-$\vartheta_{e8}$ are tunable parameters of the strengthening member. The internal angles $\vartheta_{i1}$-$\vartheta_{i8}$ and external angles $\vartheta_{e1}$-$\vartheta_{e8}$ may be tuned to provide desired characteristics in the strengthening member. For example, in the embodiment of FIGS. 6A-6B, these parameters are tuned to provide a strengthening member 600 with sloped recessed areas 614-617 having a particular depths $\delta_{614}$-$\delta_{617}$ that extend along the longitudinal length of the strengthening member 600.

As discussed and embodied herein, multiple tunable parameters—including but not limited to the lengths $S_1$-$S_{16}$ and thicknesses $T_1$-$T_{16}$ of the sides of the strengthening member, the aspect ratio of a cross section of the strengthening member, the internal angles $\vartheta_{i1}$-$\vartheta_{i8}$ and external angles $\vartheta_{e1}$-$\vartheta_{e8}$ of the corners, and the depths $\delta_{j14\text{-}j17}$ of the recess areas—may all be tuned within the same strengthening member. These parameters all may be tuned within the same strengthening member to provide desired characteristics in the strengthening member.

In the illustrated embodiments of FIGS. 2A-6B, the strengthening members may have a one-piece construction. As stated above, the one-piece constructions shown in FIGS. 2A through 6B are exemplary only and the present teachings contemplate strengthening members of other constructions such as two-piece construction or even three-or-more piece construction.

To demonstrate the improved strength and performance features of a sixteen-cornered cross section having eight internal angles and eight external angles in accordance with the present teachings, the inventors compared various existing and conventional strengthening member cross section designs to cross sections based on the designs disclosed herein. Exemplary strengthening members were modeled and crash simulation runs were conducted, as shown and described below with reference to FIGS. 7-11.

Figure 7:
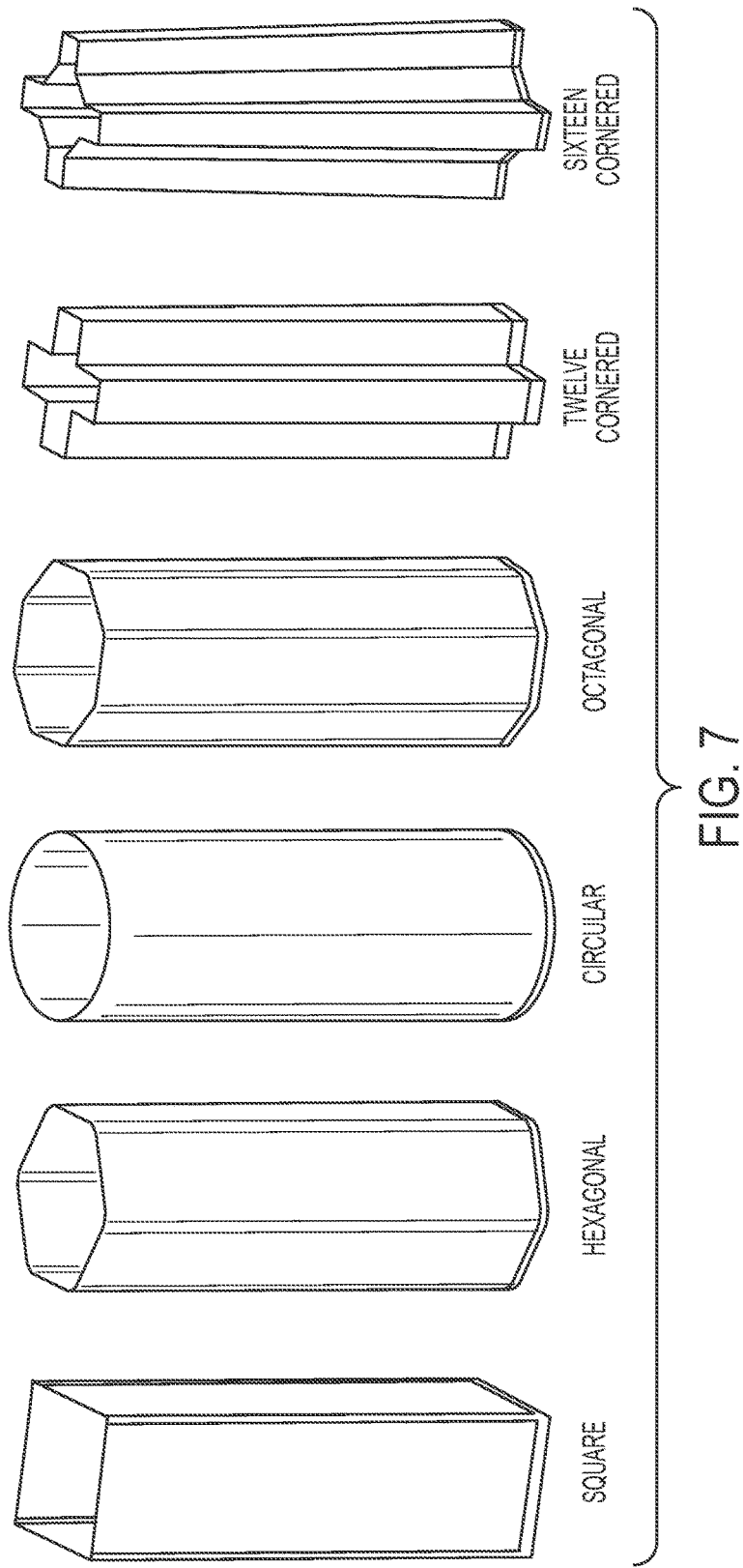
FIG. 7 illustrates strengthening members of various cross sections having substantially the same thickness, substantially the longitudinal length, and cross-sectional dimensions along perpendicularly oriented transverse axes with substantially the same lengths.

Strengthening members of varying shapes (i.e., cross sections) having the same mass, thickness, longitudinal length and the same cross-sectional lengths along perpendicular transverse axes were modeled as illustrated in FIG. 7. Crash simulations were then run for each member to simulate an impact with the same rigid mass (e.g., an impactor), impact speed, and initial kinetic energy.

Figure 8:
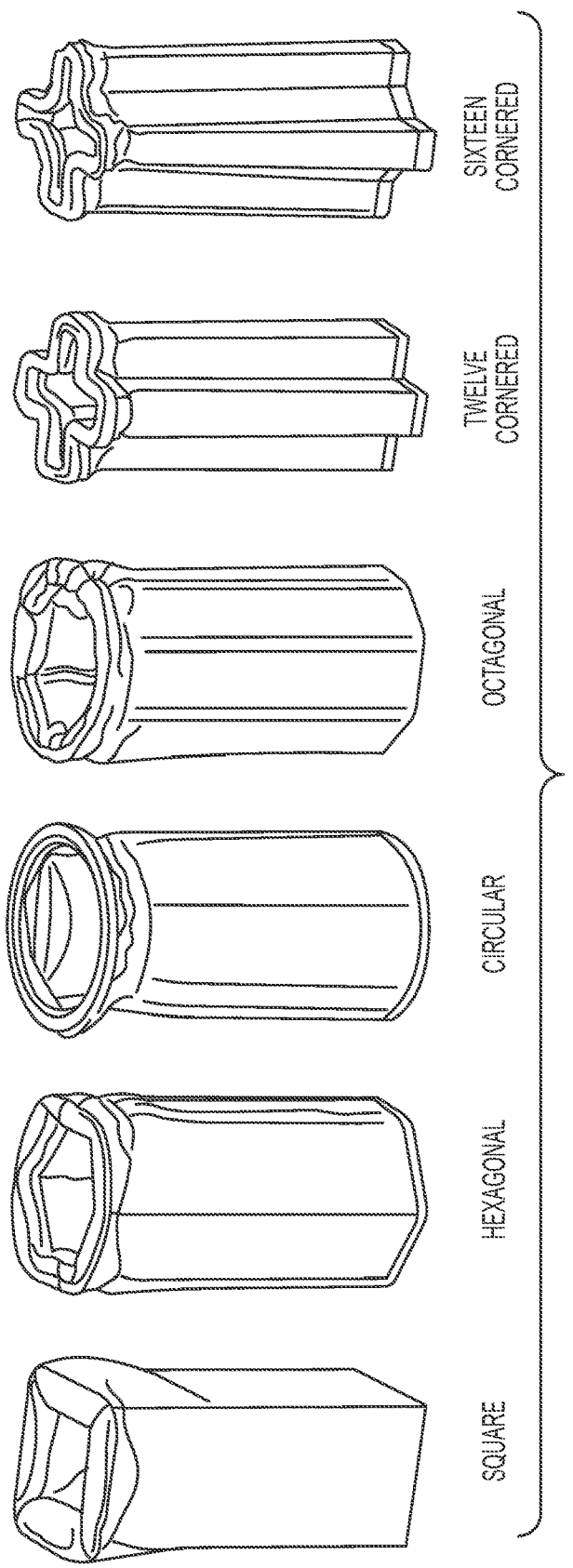
FIG. 8 illustrates an exemplary quasi-static axial collapse of the strengthening members shown in FIG. 7.

FIG. 8 shows cross members which have undergone a simulated quasi-static crush. During each quasi-static crush the impact speed is slow (e.g., 1 in/min). An impactor compresses the members with a controlled displacement. Therefore, all members reach the same crush distance with the same crush time. Thus, subjecting multiple strengthening members to a quasi-static crush provides a comparison of the folding length and the crush stability of the strengthening members. As shown in FIG. 8, the sixteen-cornered cross section in accordance with the present teachings demonstrated the most stable axial collapse and the smallest folding length.

Figure 9:
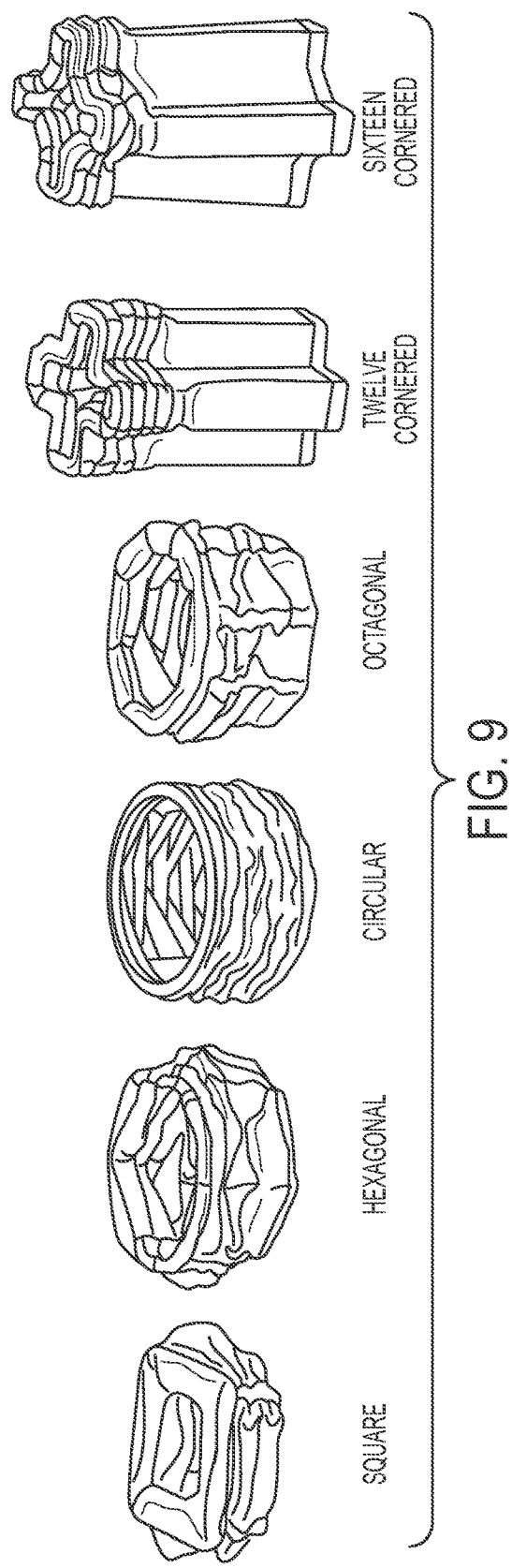
FIG. 9 illustrates an exemplary dynamic crush of the strengthening members shown in FIG. 7.

FIG. 9 shows cross members which have undergone a simulated dynamic crush. During each dynamic crush, the impactor is propelled by a gas gun with a designated mass and initial impact velocity which creates a designated initial kinetic energy. The initial kinetic energy crushes the members. Performance of each strengthening member can be compared by measuring the crush distance and specific energy absorption of each strengthening member. As shown in FIG. 9, the sixteen-cornered cross section in accordance with the present teachings also demonstrated the shortest crush distance.

Figure 10:
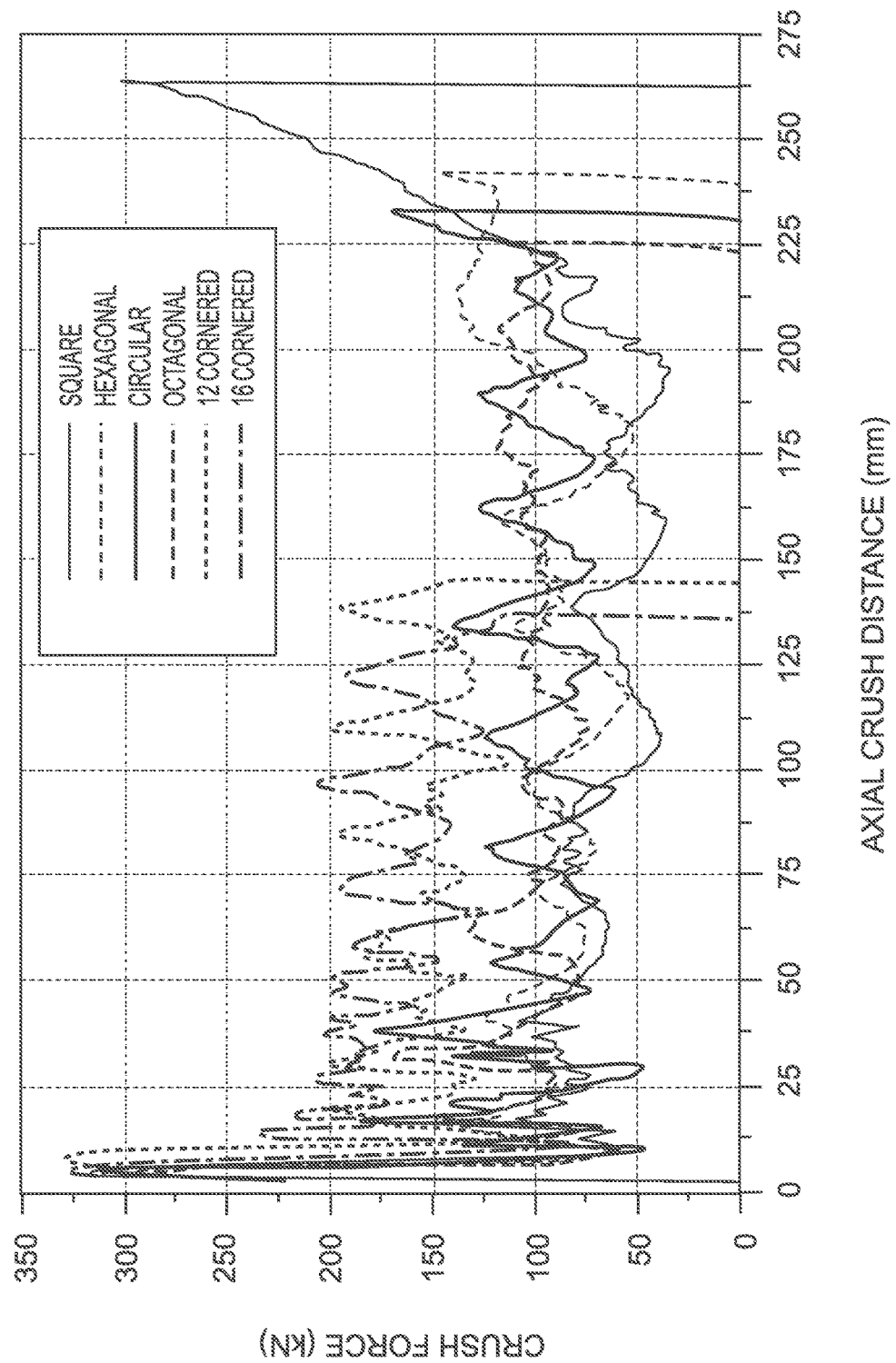
FIG. 10 is a graph of the dynamic crush force and associated crush distance for the exemplary strengthening members shown in FIG. 7.

FIG. 10 illustrates the dynamic crush force (in kN) and associated axial crush distance (in mm) for the simulated dynamic crush, exerted axially on the exemplary strengthening members having the cross sections shown in FIG. 7. As shown in FIG. 10, the strengthening member having a sixteen-cornered cross section could sustain a much higher crushing force for a given resulting crushing distance as compared with the square, hexagonal, circular, octagonal, and twelve-cornered cross sections. Specifically, the sixteen-cornered cross section in accordance with the present teachings achieved about a 65% increase in averaged crush force and/or crash energy absorption as compared with the octagon.

Figure 11:
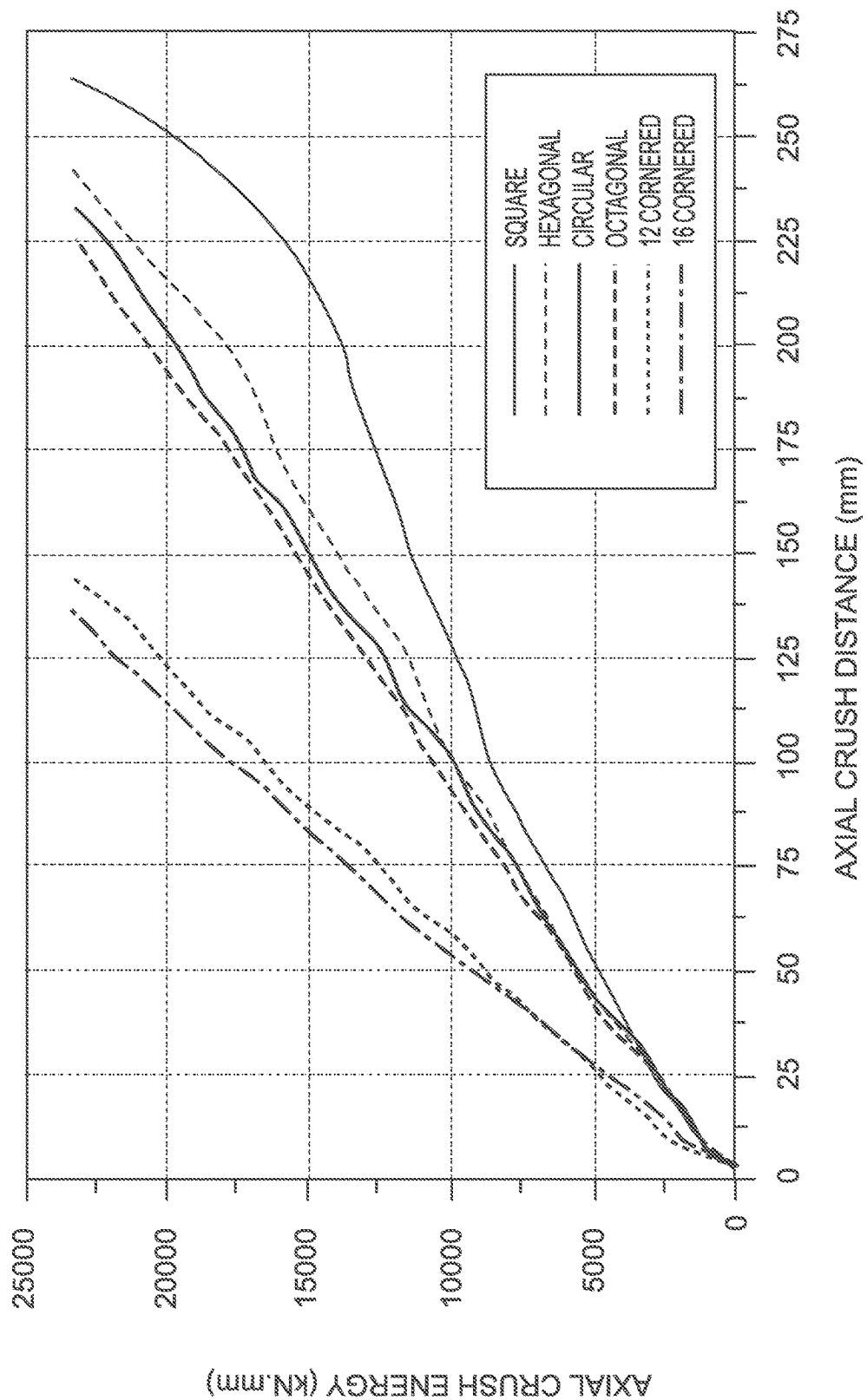
FIG. 11 is a graph of the dynamic axial crush energy and associated axial crush distance for the exemplary strengthening members shown in FIG. 7.

FIG. 11 illustrates the dynamic axial crush energy (in kN-mm) and associated axial crush distance (in mm) for a simulated dynamic crush exerted on the exemplary strengthening members having the cross sections shown in FIG. 7. As shown in FIG. 11, the strengthening member having a sixteen-cornered cross section could absorb the same total kinetic energy of the impact over a much shorter distance as compared with the square, hexagonal, circular and octagonal cross sections. In particular, a sixteen-cornered cross section in accordance with the present teachings absorbed the full axial crush energy in about 60% of the axial crush distance as the basic octagonal cross section.

To further demonstrate the improved strength and performance features of a sixteen-cornered cross section in accordance with the present teachings compared to basic sixteen-sided cross section designs, exemplary strengthening members were modeled and crash simulation runs were conducted, as shown and described below with reference to FIGS. 12-16.

Figure 12:
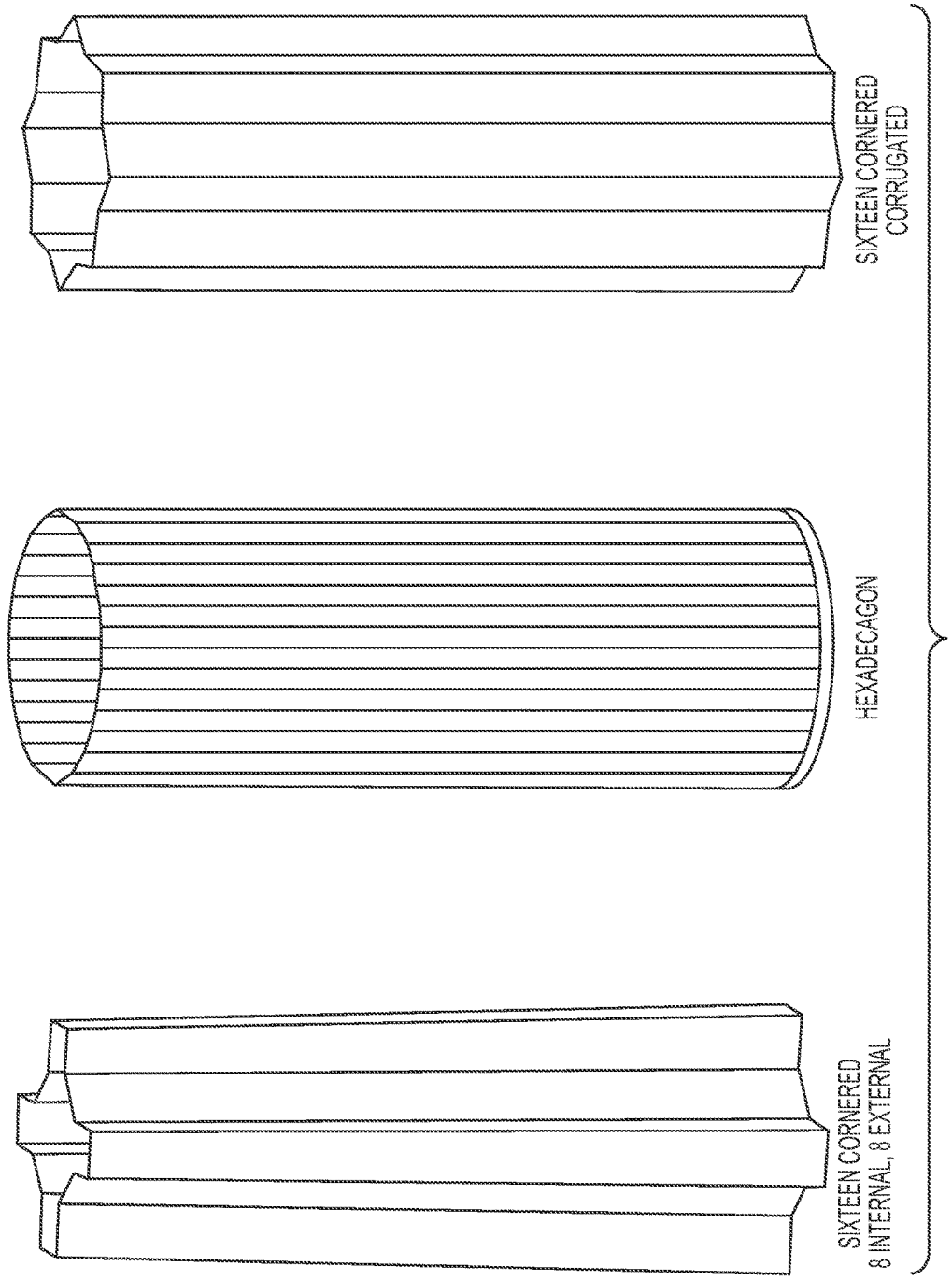
FIG. 12 illustrates sixteen-cornered strengthening members of varying cross-sectional shapes, each cross-section having sides with substantially the same thickness, substantially the same longitudinal length, and cross-sectional dimensions along perpendicularly oriented transverse axes with substantially the same lengths.
Figure 13:
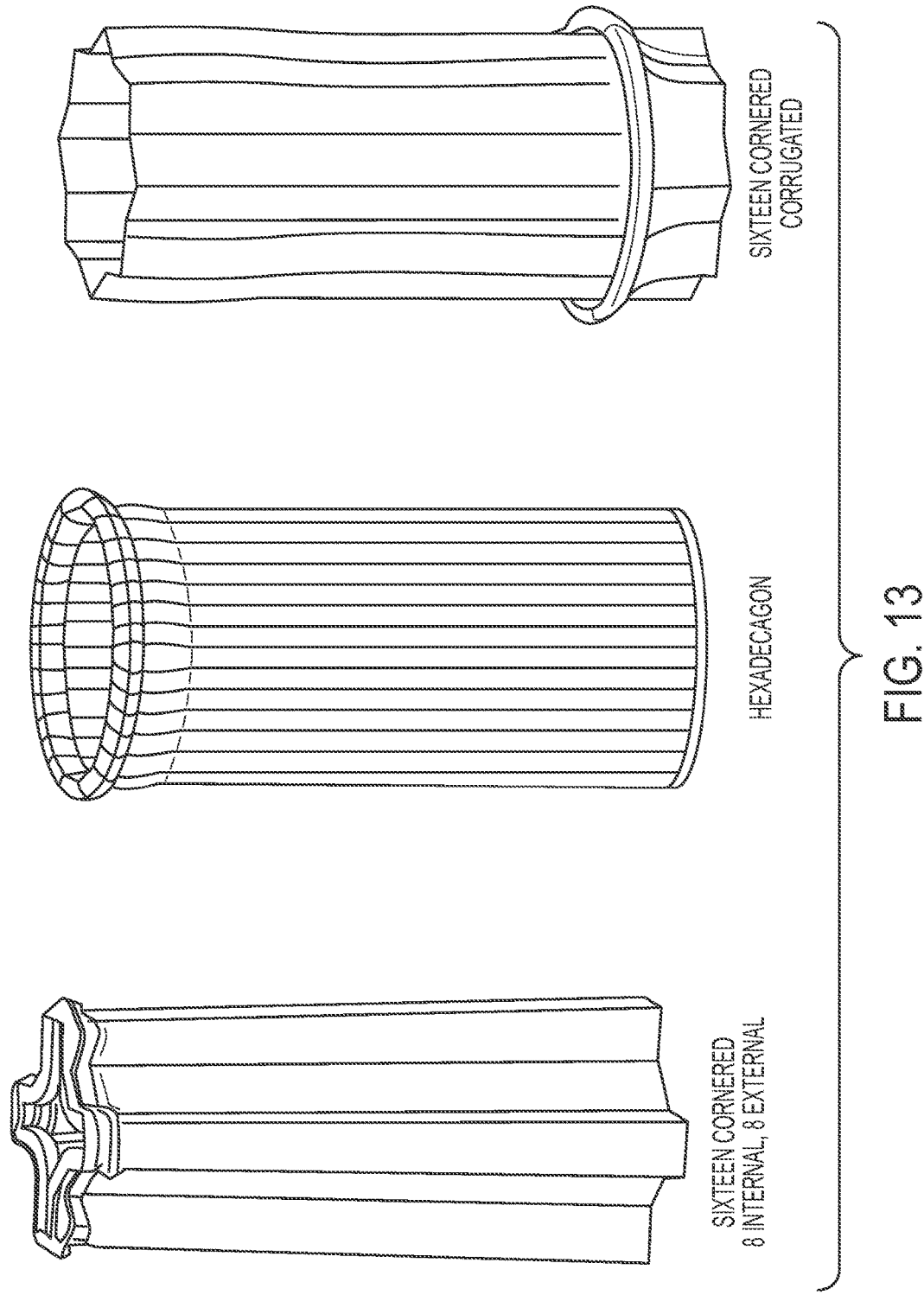
FIG. 13 illustrates an exemplary quasi-static axial collapse of the strengthening members shown in FIG. 12.
Figure 14:
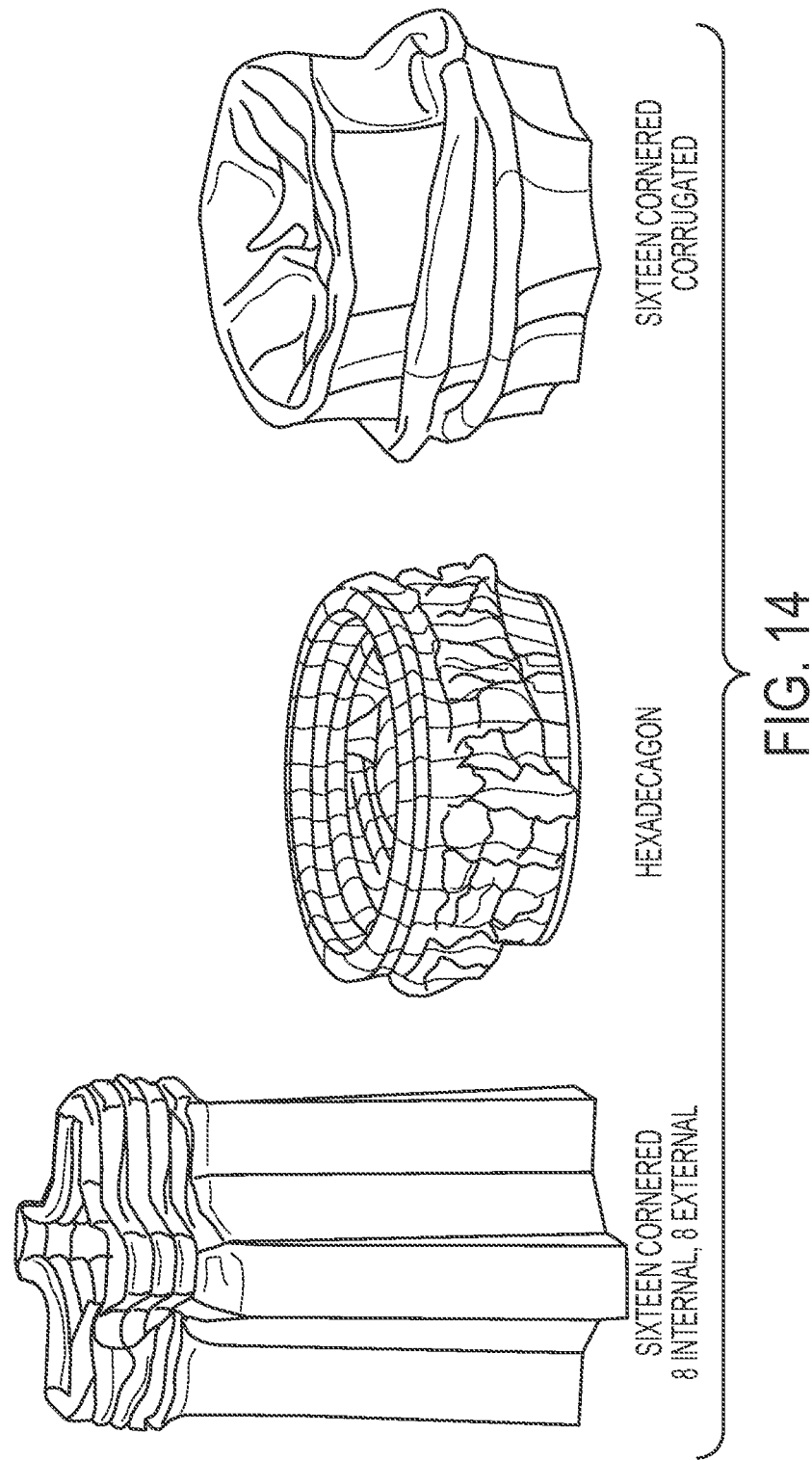
FIG. 14 illustrates an exemplary dynamic crush of the strengthening members shown in FIG. 12.

Strengthening members of varying shapes (i.e., sixteen-sided cross sections) having the same thickness, longitudinal length and the same cross-sectional lengths along perpendicular transverse axes were modeled as illustrated in FIG. 12. As above, tests were then run for each member to simulate a quasi-static collapse and a dynamic crush with the same rigid mass (e.g. an impactor), impact speed, and initial kinetic energy. As shown in FIG. 13 for the quasi-static collapse, the sixteen-cornered cross section in accordance with the present teachings demonstrated the most stable axial collapse and smallest folding length. Furthermore, as shown in FIG. 14 for the dynamic crush, the sixteen-cornered cross section in accordance with the present teachings also demonstrated the shortest crush distance.

Figure 15:
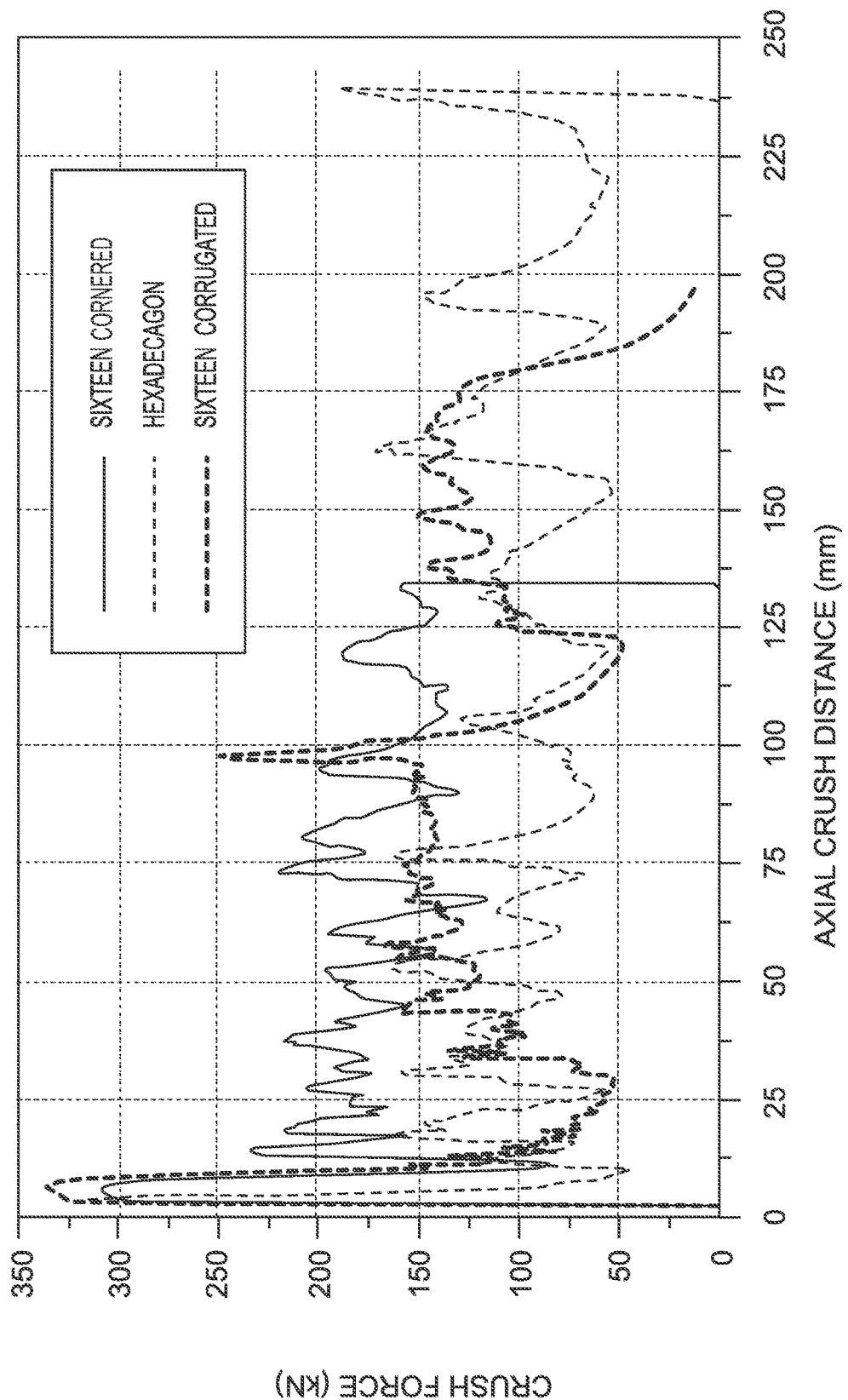
FIG. 15 is a graph of the dynamic crush force and associated axial crush distance for exemplary strengthening members having the cross sections shown in FIG. 12.

FIG. 15 illustrates the dynamic crush force (in kN) and associated axial crush distance (in mm) for the simulated dynamic crush, exerted axially on the exemplary strengthening members having the cross sections shown in FIG. 12. As shown in FIG. 15, once again, the strengthening member having a sixteen-cornered cross section in accordance with the present teachings could sustain a much higher crushing force for a given resulting crushing distance as compared with the other sixteen-sided cross sections (i.e., the basic sixteen-sided polygon (hexadecagon) and sixteen-sided corrugated polygon). In fact, the sixteen-cornered cross section in accordance with the present teachings achieved about a 75% increase in averaged crush force and/or crash energy absorption as compared with the hexadecagon.

Figure 16:
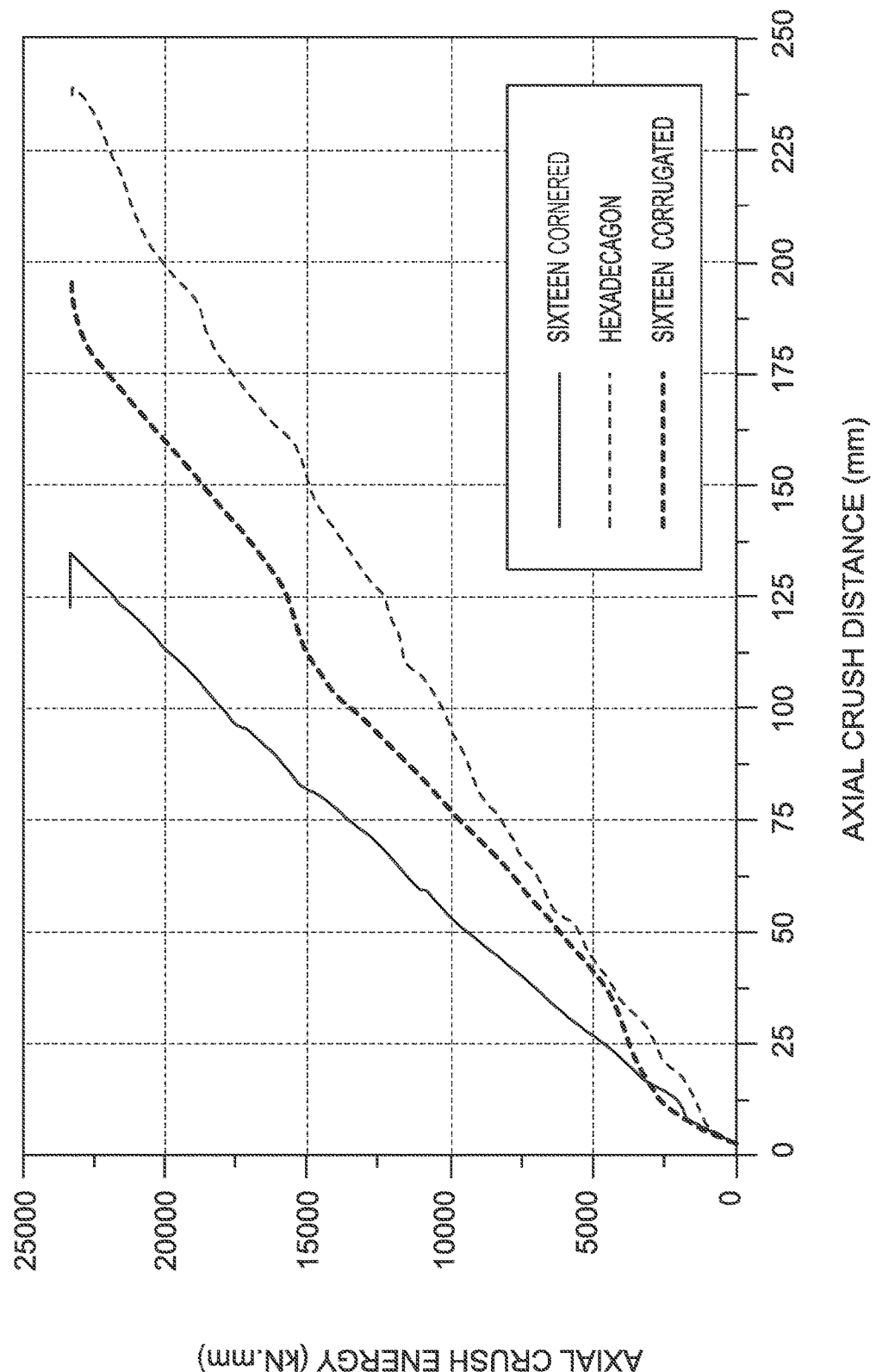
FIG. 16 is a graph of the dynamic axial crush energy and associated axial crush distance for exemplary strengthening members having the cross sections shown in FIG. 12.

FIG. 16 illustrates the axial crush energy (in kN-mm) and associated axial crush distance (in mm) for a simulated dynamic crush exerted on the exemplary strengthening members having the cross sections shown in FIG. 12. As shown in FIG. 16, once again, the strengthening member having a sixteen-cornered cross section in accordance with the present teachings could absorb the same total kinetic energy of the impact over a much shorter crush distance as compared with the other sixteen-sided cross sections. In fact, the sixteen-cornered cross section in accordance with the present teachings absorbed the full axial crush energy in about 57% of the axial crush distance as the hexadecagon.

Sixteen-cornered cross sections in accordance with the present teachings may, therefore, allow improved impact energy management over, for example, basic polygonal strengthening member cross sections, including basic sixteen-sided polygonal cross sections, while minimizing mass per unit length, provides mass saving solutions that reduce vehicle weight and meet new CAFE and emission standards.

Beyond the increased load carrying and energy absorption capabilities, strengthening members in accordance with the present teachings may provide additional advantages or benefits such as improved moisture shedding abilities (as noted above), increased bending energy absorption capacity, improved manufacturing feasibility, and better fitting of the shape amongst the other components of the complete device (e.g., vehicle).

In addition, a sixteen-cornered strengthening member in accordance with the present teachings also may be tuned to accommodate unique packaging requirements for use in various vehicles. By virtue of the particular shape of the cross section of at least some of the sixteen cornered cross members, it may be easier to couple, bond, attach, or otherwise affix other device components to the strengthening member. Other device components can include, but are not limited to, engine mounts or transmission mounts.

Sixteen-cornered strengthening members in accordance with the present teachings are contemplated for use as structural members in a number of environments. For example, in a motor vehicle, a strengthening member as disclosed herein may be used, for example, as one or more of crush cans, front rails, mid-rails, rear rails, side rails, shotguns, cross members, roof structures, beltline tubes, door beams, pillars, internal reinforcements, and other components that can benefit from increased crash energy absorption or the other advantages described herein. In addition, the present teachings can be applied to both body-on-frame and unitized vehicles, or other types of structures.

Figure 17:
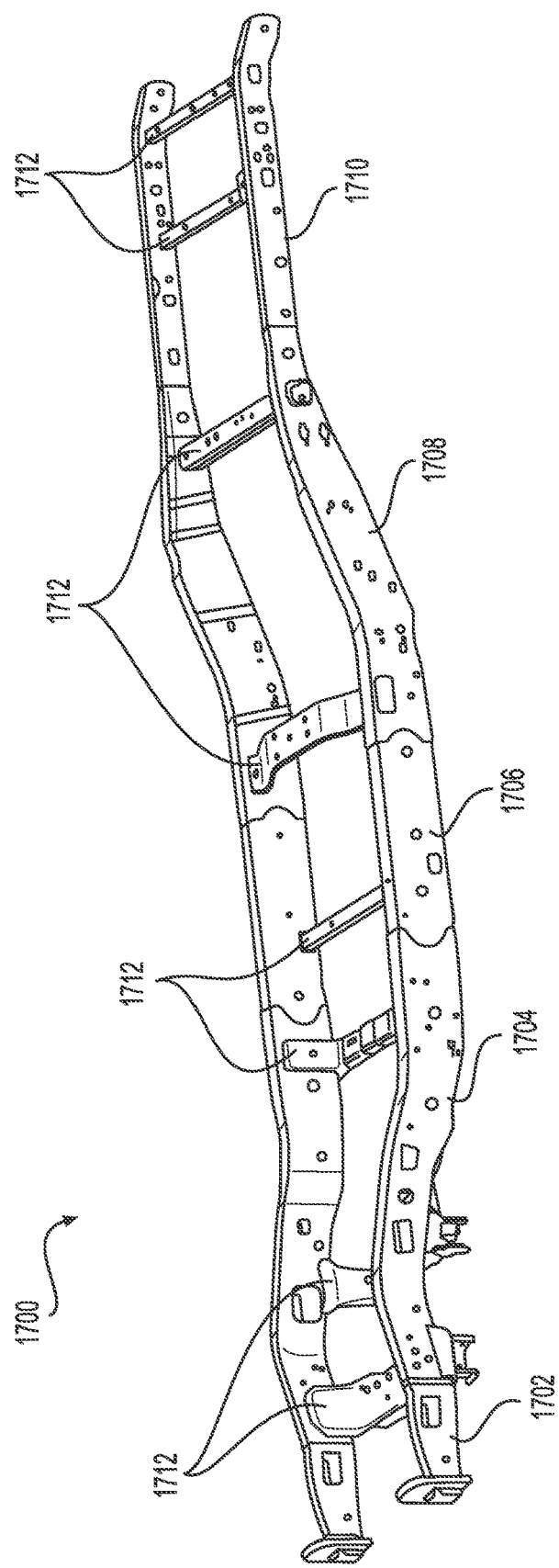
FIG. 17 illustrates an exemplary embodiment of a vehicle frame with several components for which a strengthening member having sixteen-cornered cross sections, with eight internal angles and eight external angles can be used.
Figure 18:
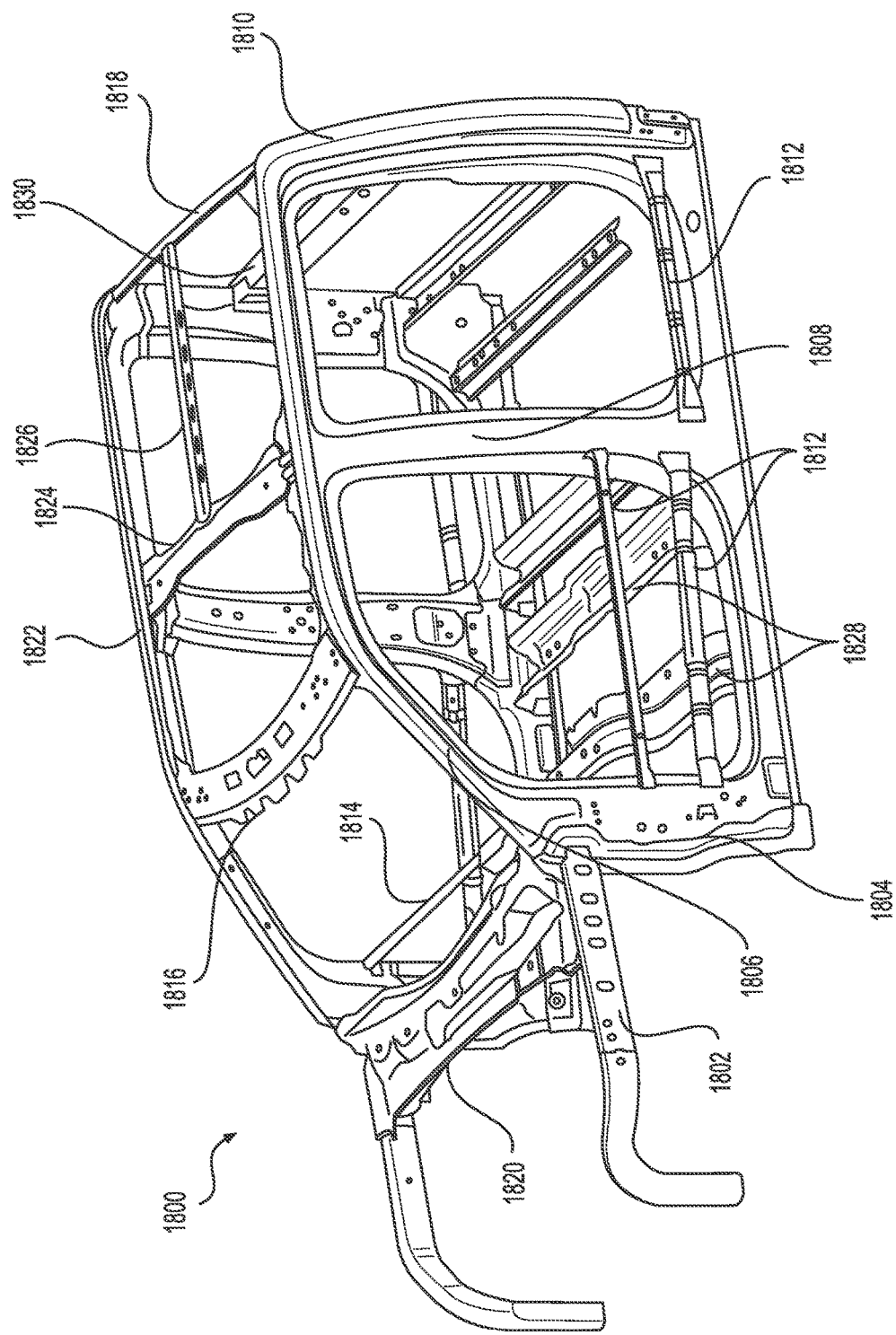
FIG. 18 illustrates an exemplary embodiment of a vehicle upper body with several components for which a strengthening member having sixteen-cornered cross sections, with eight internal angles and eight external angles can be used.

For example, as shown in FIGS. 17 and 18, sixteen-cornered strengthening members with eight internal angles and eight external angles in accordance with the present disclosure can be used to form part of or within a vehicle frame and/or a vehicle upper body. FIG. 17 illustrates an exemplary embodiment of a vehicle frame 1700 with several components for which the strengthening can be used. For example, the strengthening members in accordance with the present invention may form or be used as a part of a front horn 1702, a front rail 1704, a front side rail 1706, a rear side rail 1708, a rear rail 1710, and/or as one or more cross members 1712. Likewise, FIG. 18 illustrates an exemplary embodiment of a vehicle upper body 1800 with several components for which the strengthening can be used. For example, the strengthening members in accordance with the present disclosure may be formed or be used as a part of a shotgun 1802, a hinge-pillar 1804, an A-pillar 1806, a B-pillar 1808, a C-pillar 1810, one or more door beams 1812, a cross car beam 1814, a front header 1816, a rear header 1818, a cow top 1820, a roof rail 1822, a lateral roof bow 1824, longitudinal roof bow 1826, one or more body cross members 1828, and/or a body cross member 1830.

Moreover, the strengthening members in accordance with the present disclosure may be used as or form a part of vehicle underbody components, for example, as a rocker and/or one or more underbody cross members. Also, the strengthening members in accordance with the present disclosure may be used as or form a part of vehicle engine compartment components, for example, as one or more engine compartment cross members.

Depending on the application, embodiments of the present teachings will have varied shapes (i.e. various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

Although various exemplary embodiments described herein have been described as configured to be used with automotive vehicles, it is envisioned that the various strengthening members in accordance with the present teachings may be configured for use with other types of vehicles (e.g. aircrafts, spacecrafts and watercrafts) and/or structures, for which it may be desirable to provide increased crash energy absorption. Thus, it will be appreciated by those of ordinary skill in the art having the benefit of this disclosure that the present teachings provide strengthening members for various applications. Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

In particular, those skilled in the art will appreciate that a strengthening member may include more than one longitudinal section or portion, with each section or portion having one or more of the variations taught in accordance with the present disclosure. Said variation(s) can be made continuously or intermittently along the length of each longitudinal section. In other words, strengthening members that embody combinations of one or more of the above variations to the disclosed tunable parameters, which have not been illustrated or explicitly described, are also contemplated.

What is claimed is:

1. A strengthening member for a motor vehicle, comprising a sixteen-cornered cross section consisting of sixteen corners and sixteen sides forming eight internal angles ranging between about 90° and about 145° and eight external angles ranging between about 95° and about 175°, wherein each internal angle of the eight internal angles is positioned directly between one internal angle of the eight internal angles and one external angle of the eight external angles and each external angle of the eight external angles is positioned directly between one internal angle of the eight internal angles and one external angle of the eight external angles.

2. The strengthening member of claim 1, wherein the cross section has four bisecting planes of symmetry.

3. The strengthening member of claim 1, wherein at least one internal angle of the eight internal angles varies along at least a portion of a length of the strengthening member.

4. The strengthening member of claim 1, further comprising at least one recessed portion extending along a length of the strengthening member.

5. The strengthening member of claim 4, wherein the at least one recessed portion is defined by two of the eight internal angles and two of the eight external angles.

6. The strengthening member of claim 1, wherein a shape of the sixteen-cornered cross section includes a central portion and four lobes extending outward from the central portion.

7. The strengthening member of claim 1, wherein the cross section has more than two bisecting planes of symmetry.

8. The strengthening member of claim 1, wherein each internal angle of the eight internal angles is substantially the same.

9. The strengthening member of claim 1, wherein each external angle of the eight external angles is substantially the same.

10. The strengthening member of claim 1, wherein at least one internal angle of the eight internal angles is a right angle.

11. The strengthening member of claim 10, wherein each internal angle of the eight internal angles is a right angle.

12. The strengthening member of claim 5, wherein the two external angles defining the recessed portion are the same.

13. The strengthening member of claim 5, wherein the two internal angles defining the recessed portion are each greater than 90 degrees.

14. The strengthening member of claim 4, wherein the at least one recessed portion is defined by three sides of the strengthening member.

15. The strengthening member of claim 14, wherein the three sides of the strengthening member defining the at least one recessed portion have the same length.

16. The strengthening member of claim 14, wherein two of the three sides of the strengthening member defining the at least one recessed portion have the same length and the other of the three sides has a different length.

17. The strengthening member of claim 1, wherein the sixteen corners of the cross section have substantially the same thickness as the sixteen sides of the cross section.

18. The strengthening member of claim 4, wherein the at least one recessed portion consists of four recessed areas, wherein each recessed area extends along a length of the strengthening member from a first end of the strengthening member to a second end of the strengthening member.

* * * * *